United States Patent
Li

(10) Patent No.: US 9,560,621 B2
(45) Date of Patent: Jan. 31, 2017

(54) METHOD, APPARATUS, AND SYSTEM FOR DETERMINING A LOCATION OF A TERMINAL

(71) Applicant: Alibaba Group Holding Limited, George Town (KY)

(72) Inventor: Xiaojian Li, Hangzhou (CN)

(73) Assignee: Alibaba Group Holding Limited (KY)

( * ) Notice: Subject to any disclaimer, the term of this patent is extended or adjusted under 35 U.S.C. 154(b) by 0 days.

(21) Appl. No.: 14/708,516

(22) Filed: May 11, 2015

(65) Prior Publication Data

US 2015/0327007 A1 Nov. 12, 2015

(30) Foreign Application Priority Data

May 12, 2014 (CN) .......................... 2014 1 0199350

(51) Int. Cl.
*H04W 24/00* (2009.01)
*H04W 64/00* (2009.01)
*H04W 4/02* (2009.01)
*H04L 29/08* (2006.01)
*H04L 29/12* (2006.01)

(52) U.S. Cl.
CPC ............ *H04W 64/00* (2013.01); *H04L 61/609* (2013.01); *H04L 67/18* (2013.01); *H04W 4/02* (2013.01); *H04L 61/2007* (2013.01); *H04W 24/00* (2013.01)

(58) Field of Classification Search
CPC ........ H04W 64/00; H04W 4/02; H04W 24/00; H04L 67/18; H04L 31/609; H04L 61/2007
USPC ..................................... 455/456.1–456.4, 457
See application file for complete search history.

(56) References Cited

U.S. PATENT DOCUMENTS

| | | | |
|---|---|---|---|
| 5,684,959 A | 11/1997 | Bhat et al. | |
| 5,736,964 A | 4/1998 | Ghosh et al. | |
| 5,754,767 A | 5/1998 | Ruiz | |
| 5,890,068 A | 3/1999 | Fattouche et al. | |
| 6,131,119 A | 10/2000 | Fukui | |
| 6,684,250 B2 | 1/2004 | Anderson et al. | |
| 6,782,436 B1 | 8/2004 | Baker | |
| 7,000,029 B2 | 2/2006 | Marian et al. | |
| 7,110,779 B2 | 9/2006 | Billhartz et al. | |
| 7,702,309 B2 | 4/2010 | Faccin et al. | |
| 8,315,649 B1 | 11/2012 | McClendon et al. | |
| 8,402,120 B1 | 3/2013 | Perkinson | |
| 8,867,531 B2 | 10/2014 | Lee et al. | |

(Continued)

FOREIGN PATENT DOCUMENTS

| | | |
|---|---|---|
| CA | 2851744 | 9/2013 |
| WO | 2007121331 | 10/2007 |

*Primary Examiner* — Mong-Thuy Tran
(74) *Attorney, Agent, or Firm* — Van Pelt, Yi & James LLP

(57) ABSTRACT

Embodiments of the present application relate to a method, apparatus, and system for determining a location of a terminal. The method includes acquiring a Media Access Control (MAC) address of a network equipment used by a terminal to access a network, determining whether a database indicating locations associated with respective MAC addresses includes the acquired MAC address, and in the event that the database indicating locations associated with respective MAC addresses includes the acquired MAC address, determining that a current location of the terminal corresponds to a location associated with the acquired MAC address that is stored in the database, and outputting the current location of the terminal.

19 Claims, 12 Drawing Sheets

(56) References Cited

U.S. PATENT DOCUMENTS

| | | | |
|---|---|---|---|
| 9,026,145 B1* | 5/2015 | Duleba | H04L 61/25 455/456.3 |
| 2006/0025158 A1 | 2/2006 | Leblanc et al. | |
| 2007/0270164 A1* | 11/2007 | Maier | H04W 64/00 455/456.2 |
| 2008/0065774 A1* | 3/2008 | Keeler | G06F 17/30528 709/227 |
| 2008/0176583 A1* | 7/2008 | Brachet | G01S 5/0236 455/456.3 |
| 2008/0252518 A1 | 10/2008 | Yeshayahu | |
| 2008/0274752 A1* | 11/2008 | Houri | G01S 5/0252 455/456.1 |
| 2008/0317021 A1 | 12/2008 | Ives et al. | |
| 2010/0151816 A1* | 6/2010 | Besehanic | G06Q 30/02 455/405 |
| 2013/0150085 A1* | 6/2013 | Jin | G01S 19/48 455/456.2 |
| 2013/0237250 A1* | 9/2013 | Annamalai | H04W 4/02 455/456.2 |
| 2014/0018111 A1* | 1/2014 | Farley | G01S 5/0252 455/456.6 |
| 2014/0128093 A1* | 5/2014 | Das | H04W 64/006 455/456.1 |
| 2014/0213299 A1* | 7/2014 | Marti | G06F 3/048 455/456.3 |
| 2014/0342755 A1* | 11/2014 | Youssef | G01S 1/685 455/456.2 |
| 2015/0080014 A1* | 3/2015 | Ben-Yosef | H04W 4/043 455/456.1 |
| 2015/0119071 A1* | 4/2015 | Basha | H04W 64/00 455/456.1 |
| 2015/0204676 A1* | 7/2015 | Zhang | G01C 21/206 701/410 |
| 2015/0264008 A1* | 9/2015 | Li | G06Q 10/10 709/245 |

* cited by examiner

METHOD, APPARATUS, AND SYSTEM FOR DETERMINING A LOCATION OF A TERMINAL

CROSS REFERENCE TO OTHER APPLICATIONS

This application claims priority to People's Republic of China Patent Application No. 201410199350.5 entitled A METHOD AND A DEVICE FOR DETERMINING THE LOCATION OF A TERMINAL, filed May 12, 2014 which is incorporated herein by reference for all purposes.

FIELD OF THE INVENTION

The present application relates to a field of Internet technology. In particular, the present application relates to a method, a device, and a system for determining the location of a terminal.

BACKGROUND OF THE INVENTION

Currently, many terminals (e.g., desktop computers, notebook computers, and the like) typically do not have a Global Positioning System (GPS) positioning module included therein, or otherwise connected thereto. Consequently, determining the location information of such terminals that lack a positioning function (e.g., a GPS module) is difficult.

According to some related art, some applications that are provided in connection with a terminal include the use of location information of the terminal. As a result, such applications include acquiring user geographic location information (e.g., the location of the terminal). An example of an application that uses location information includes the display of promotional information. In the event that the location information for a user can be acquired, promotional information associated with the area surrounding a user can be displayed in connection with the application (e.g., on a website browsed by the user). The promotional information can include information on movie theaters, restaurants, shopping places, or the like near the location of the user. Because the application displays promotional information that can be configured according to a location of a user, greater accuracy in the location information of online users with such terminals will result in the display of promotional information that is more accurate and can improve user experience on such terminals.

As another example, many users simultaneously use PC terminals and mobile terminals. For example, applications such as Weibo and Weixin have client versions and PC terminal web page versions. Collection of location information when a user accesses an application using a PC terminal and location information when the user accesses an application using a cell phone terminal can be used for security purposes such as determining whether a user account is at risk of being compromised based on a comparison between the location information of the PC terminal and the location information of the cell phone terminal (e.g., the distance between the two geographic locations).

According to some related art, the location of a terminal can be determined using information from an IP bank (e.g., an IP address database) provided by an operator. For example, the IP banks are commercially available databases that map a geographic location to a particular IP address (or range of IP addresses). The geographic location information for the IP address is queried (e.g., looked up) using the IP address of such a terminal. However, the IP banks provided by operators only provide a broad geographic location corresponding to an IP address (e.g., the geographic location provided by the IP banks generally only identifies a city as the geographic location corresponding to an IP address). Accordingly, the geographic location information provided by IP banks is imprecise. For example, in Hangzhou, Beijing, and other large cities, providing accurate positioning of a terminal using information from an IP bank is generally not possible.

Therefore, there is a need for better ways to determine a location of a terminal.

BRIEF DESCRIPTION OF THE DRAWINGS

Various embodiments of the invention are disclosed in the following detailed description and the accompanying drawings.

The drawings described here are intended to further the understanding of the present application and form a part of this application. The illustrative embodiments of the present application and the descriptions thereof are intended to explain this application and do not constitute inappropriate limitation of the present application. Among the drawings.

DETAILED DESCRIPTION

Figure 1:
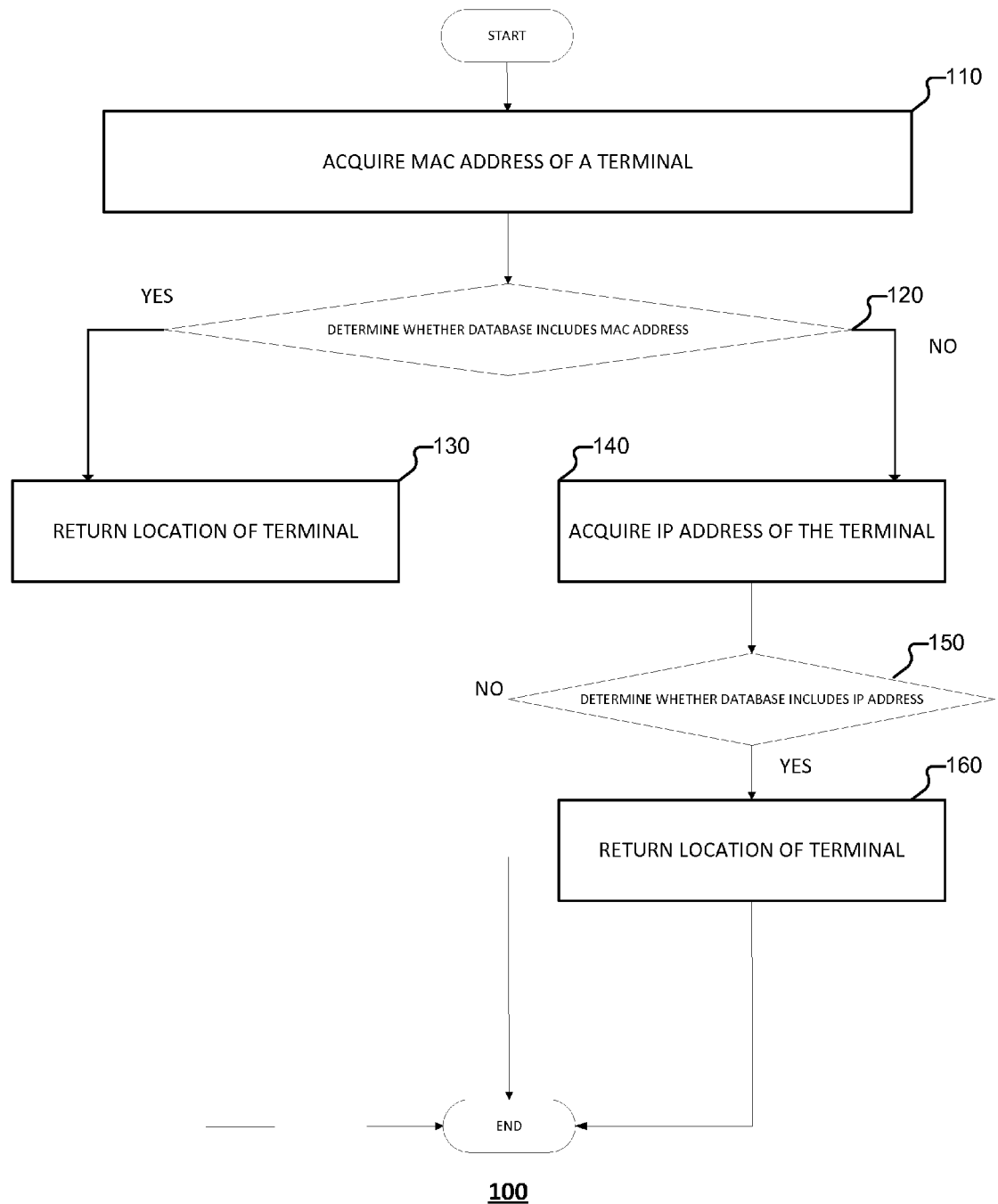
FIG. 1 is a flowchart of a method for determining terminal location according to various embodiments of the present application.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Various embodiments of the present disclosure include a method, an apparatus, and a system for determining a location (e.g., a geographic location) of a device (e.g., a terminal). According to various embodiments, a database indicating locations associated with one or more Media Access Control (MAC) addresses can be configured. According to various embodiments, a database indicating locations associated with one or more Internet Protocol (IP) addresses can be configured. According to various embodiments, in the event that a terminal connects to a network (e.g., the Internet), a location of the terminal can be determined by using (e.g., querying) a database indicating a location associated with the MAC address or the IP address of the terminal.

Technical solutions of the present application are described clearly and completely below in light of specific embodiments and corresponding drawings of the present application. The embodiments described are only some of the embodiments of the present application and are not all the embodiments. All other embodiments obtained on the basis of the embodiments of the present application by persons with ordinary skill in the art shall fall within the scope of protection of the present application so long as no inventive effort is made in the course of obtaining them.

A terminal generally refers to a device used (e.g., by a user) within a network system and used to communicate with one or more servers. According to various embodiments of the present disclosure, a terminal may include communication functionality. For example, a terminal may be a smart phone, a tablet Personal Computer (PC), a mobile phone, a video phone, an e-book reader, a desktop PC, a laptop PC, a netbook PC, a Personal Digital Assistant (PDA), a Portable Multimedia Player (PMP), an mp3 player, a mobile medical device, a camera, a wearable device (e.g., a Head-Mounted Device (HMD), electronic clothes, electronic braces, an electronic necklace, an electronic accessory, an electronic tattoo, or a smart watch), or the like.

According to some embodiments of the present disclosure, a terminal includes a smart home appliance with communication functionality. A smart home appliance can be, for example, a television, a Digital Video Disk (DVD) player, an audio device, a refrigerator, an air conditioner, a vacuum cleaner, an oven, a microwave oven, a washer, a dryer, an air purifier, a set-top box, a TV box (e.g., Samsung HomeSync™, Apple TV™, or Google TV™), a gaming console, an electronic dictionary, an electronic key, a camcorder, an electronic picture frame, or the like.

According to various embodiments of the present disclosure, a terminal can be any combination of the foregoing devices. In addition, it will be apparent to one having ordinary skill in the art that a terminal according to various embodiments of the present disclosure is not limited to the foregoing devices.

FIG. 1 is a flowchart of a method for determining terminal location according to various embodiments of the present application.

Referring to FIG. 1, a method 100 for determining a location of a terminal is provided. In some embodiments, the method 100 is implemented by device 1000 of FIG. 10. In some embodiments, the method 100 is implemented by system 1100 of FIG. 11.

At 110, a MAC address of a terminal is acquired. In some embodiments, the MAC address of the terminal is acquired in the event that the terminal connects to a network such as the Internet or the like. For example, a server (e.g., a device connected to the network and configured to perform hosting or otherwise functions, and is associated with a website, a web service, or the like) can receive a message from the terminal. The message can be an access request or the like. The message can include the MAC address of the terminal. The message can be an HTTP message such as a GET message, a POST message, or a message in any other appropriate format. In some embodiments, the server extracts the MAC address from the header or payload of a message received from the terminal. The MAC address can be a physical address or hardware address associated with the terminal. The MAC address can be globally unique.

The terminal can connect to the network (e.g., the Internet) by receiving wireless network signals transmitted by wireless signal transceiver equipment. The wireless signal transceiver equipment can correspond to equipment configured to convert wired network signals to wireless network signals so as to provide the wireless network signals to equipment within a signal coverage range of the wireless signal transceiver equipment. Equipment (e.g., a terminal) within the signal coverage range of the wireless signal transceiver equipment can wirelessly connect to the Internet by receiving the wireless network signals. A wireless router is an example of a wireless signal transceiver equipment that converts wired network signals to WiFi signals. Wireless network equipment (e.g., WiFi-supporting notebook computers, cell phones, and tablet computers) within the signal coverage range of the wireless signal transceiver equipment can access the Internet by receiving the WiFi signals transmitted by the wireless signal transceiver equipment.

At 120, a determination of whether a database includes the MAC address of the terminal is made. In some embodiments, a server (e.g., the server that acquires the MAC address) determines whether the database includes the MAC address. The database can be a database that stores a mapping of a location (e.g., geographic location) associated with a MAC address. For example, the database stores a plurality of records that respectively relate to a mapping of a location associated with a particular MAC address. The location can include information associated with a longitude and a latitude. For example, the location can include information that indicates the longitude coordinates and the latitude coordinates corresponding to the location.

The server can determine whether the database includes the MAC address by querying the database. For example, the server can determine whether the database includes the MAC address based at least in part on a response received in connection with a query of the database for location information associated with the MAC address. In the event that a response to the query of the database for location information associated with the MAC address is unresponsive (e.g., if the response indicates that no record exists, or location information does not exist), then the server can determine that the database does not include the MAC address.

In some embodiments, the database can be a commercially available service (e.g., provided by a third party). The database can be manually or automatically configured to include location information corresponding to a terminal associated with a MAC address in the event that the database does not include a MAC address (e.g., in the event that the database does not store a record including location information associated with the MAC address).

In some embodiments, the location information associated with a MAC address can be used to determine a location of a terminal corresponding to the MAC address. For example, the location information can be used to determine a latitude and a longitude of the terminal corresponding to the MAC address.

In the event that the database is determined to include the MAC address (e.g., location information associated with the MAC address), then at 130, a location of the terminal can be returned. In some embodiments, the location can be returned to the server. In some embodiments, the server can determine the location based on information provided to the server in response to a query of the database for information associated with the acquired MAC address. The server can use the location information associated with the MAC address to provide context-based content (e.g., news, weather, advertisements, the like, or any combination thereof) to the terminal corresponding to the MAC address.

In contrast, in the event that the database is determined to not include the MAC address (e.g., the database does not store location information associated with the MAC address), then at 140, an IP address of the terminal is acquired. In some embodiments, the IP address of the terminal is acquired in the event that the terminal connects to a network such as the Internet or a private network. For example, a server can receive a message from the terminal. The message can be an access request or the like. The message can include the IP address of the terminal in its header or payload. The message can be an HTTP message such as a GET message, a POST message, or a message in any other appropriate format. In some embodiments, the server extracts the IP address from the header or payload of a message received from the terminal. The IP address can be globally unique.

At 150, a determination of whether a database includes the IP address of the terminal is made. In some embodiments, a server (e.g., the server that acquires the IP address) determines whether the database includes the IP address.

The database can be a database that stores a mapping of a location (e.g., geographic location) associated with an IP address. For example, the database (e.g., the database indicating locations associated with IP addresses) stores a plurality of records that respectively relate to a mapping of a location associated with a particular IP address. The location can include information associated with a longitude and a latitude. For example, the location can include information that indicates the longitude coordinates and the latitude coordinates corresponding to the location.

The server can determine whether the database includes the IP address by querying the database. For example, the server can determine whether the database includes the IP address based at least in part on a response received in connection with a query of the database for location information associated with the IP address. In the event that a response to the query of the database for location information associated with the IP address is unresponsive (e.g., if the response indicates that no record exists, or location information does not exist), then the server can determine that the database does not include the IP address.

In some embodiments, the database can be a commercially available service (e.g., provided by a third party). The database can be manually or automatically configured to include location information corresponding to a terminal associated with an IP address in the event that the database does not include an IP address (e.g., in the event that the database does not store a record including location information associated with the IP address).

In some embodiments, the location information associated with an IP address can be used to determine a location of a terminal corresponding to the IP address. For example, the location information can be used to determine a latitude and a longitude of the terminal corresponding to the IP address.

In the event that the database is determined to include the IP address (e.g., location information associated with the IP address), then at 160, a location of the terminal can be returned. In some embodiments, the location can be returned to the server. In some embodiments, the server can determine the location based on information provided to the server in response to a query of the database for information associated with the acquired IP address. The server can use the location information associated with the IP address to provide context-based content (e.g., news, weather, advertisements, the like, or any combination thereof) to the terminal corresponding to the IP address.

Figure 2:
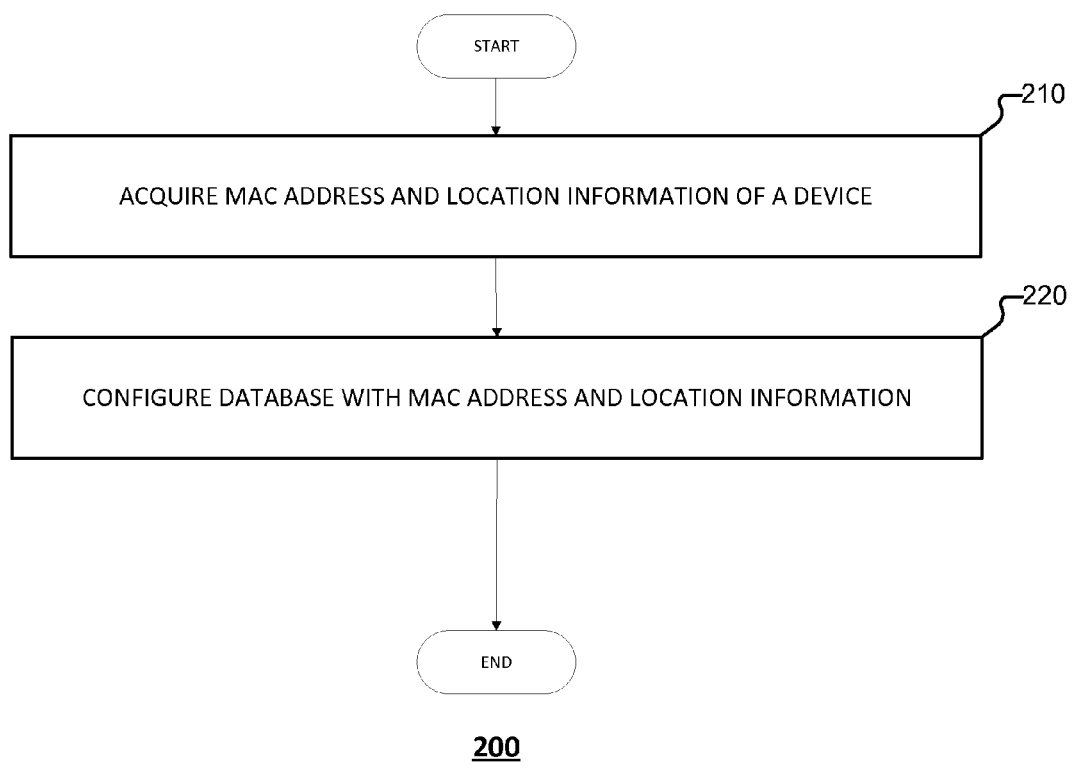
FIG. 2 is a flowchart of pre-configuring a database indicating locations associated with Media Access Control (MAC) addresses according to various embodiments of the present application.

FIG. 2 is a flowchart of pre-configuring a database indicating locations associated with MAC addresses according to various embodiments of the present application.

Referring to FIG. 2, a method 200 for configuring a database indicating locations associated with MAC addresses is provided. In some embodiments, the method 200 is implemented by device 1000 of FIG. 10. In some embodiments, the method 200 is implemented by system 1100 of FIG. 11.

At 210, a MAC address of a device and location information of a device (e.g., location information corresponding to the MAC address) are acquired. In some embodiments, a server acquires (e.g., collects) the MAC address and the location information corresponding to the MAC address. The server can acquire the MAC address and the location information of the MAC address in connection with a network access event. For example, the network access event can be a terminal accessing the Internet, browsing a web page, communicating with a network device, etc. As an example, the MAC addresses can correspond to the MAC addresses of wireless signal transceiver equipment (e.g., wireless routers, wireless switches, etc.) through which the terminal communicates, and can be attached to the header or payload of a message in a specified field. The location information can include latitude information (e.g., latitude coordinates) and longitude information (e.g., longitude coordinates), and be included in a packet header or payload. In some embodiments, the location information of a terminal connecting to the Internet via the wireless signal transceiver equipment using wireless signals (e.g., WiFi signals) can be used to determine the location of a MAC address.

In some embodiments, in the event that a mobile device connects to the Internet through (e.g., using) wireless network signals (such as but not limited to WiFi signals) transmitted by a wireless signal transceiver equipment, the MAC address of the wireless signal transceiver equipment that is transmitting the wireless network signals can be acquired. For example, in the event that a mobile device accesses the Internet, the mobile device sends a packet to the networking equipment, which attaches its MAC address to the packet header or payload and then forwards the packet to its destination. Thus, the MAC address of the wireless signal transceiver device (e.g., network equipment) that the mobile device uses to access the Internet can be acquired by analyzing the packet header or payload downstream from the wireless signal transceiver device, such as when the packet reaches its destination server.

In some embodiments, the location of the network device that the mobile device uses to access the Internet is pre-configured. For example, because the network device likely has a fixed location, the location information can be configured at installation time of the network device (e.g., obtained by invoking a GPS function on the network device or entered manually) and stored in a configuration file or the like. The location information is provided (e.g., included in a packet header or payload) when a terminal accesses the Internet via the network device.

In the event that the terminal has a Global Positioning System (GPS) positioning function, then the location information (e.g., the latitude information and the longitude information) of the terminal when the terminal accesses the Internet (e.g., when the terminal goes online) using the wireless signal transceiver equipment can be acquired and serves as the location information corresponding to the MAC address of the wireless transceiver.

In some embodiments, various apps (e.g., client applications) installed on the mobile terminal can be used to acquire the MAC address and the location information associated with the MAC address. For example, an application installed on the mobile terminal can collect a large volume of log information in connection with the communication between the mobile terminal and the network device (e.g., the network equipment such as a wireless signal transceiver equipment). The log information can be collected when the mobile terminal receives responses from the network device so as to acquire the MAC address of the network device and the location information corresponding thereto. For example, header information and/or payload information can be extracted from the responses sent by the network device to generate the log information including the MAC address and/or location information of the MAC address.

In some embodiments, a wireless signal receiver (e.g., a WiFi receiver) on the mobile terminal receives and records the wireless signal transceiver equipment information (e.g., the MAC address, the IP address, the like, or any combination thereof) and location information of wireless network signals transmitted from various locations (e.g., wireless network signals communicated between a mobile device and a network device) in a city.

In some embodiments, the MAC addresses and corresponding location information of a device (e.g., a mobile device, a network device, the like, or any combination thereof) can be collected within a predetermined collection period of time prior to the current time (e.g., the time at which location of the terminal is determined using the database in connection with a location-based service). The MAC addresses and corresponding location information can be collected in connection with network communications that occurred within a predetermined collection period of time before the current time. For example, the MAC address of wireless signal transceiver equipment can be collected when a terminal accessed a network such as the Internet. The location information of the terminal when the terminal accessed the Internet via the wireless signal transceiver equipment is collected. In some embodiments, the terminal has a positioning function (e.g., a GPS function) that can be invoked to determine the location of the terminal when the terminal accesses the Internet. The terminal can communicate the location information associated with the MAC address when the terminal accesses the Internet and attaches the MAC address in the header or payload of a packet to a server.

Because the wireless network signals transmitted by wireless signal transceiver equipment have a certain effective coverage range (e.g., generally being within 50 meters), each piece of wireless signal transceiver equipment will collect one or more pieces of latitude information and longitude information from the different terminals that implement a positioning function. For example, a plurality of terminals, each respectively implementing a positioning function, can access the Internet using a network device. In the event that at least two of the plurality of terminals have different locations, then the location information used (e.g., collected) in connection with the MAC address of the network device will be different. For example, the location information associated with the network device can be different because of the different locations of the terminals that access the Internet using the network device. At different positions within the effective coverage range of the equipment signals, different terminals use the wireless network signals transmitted by the equipment to access the Internet. As another example, the same terminal can access the Internet (e.g., communicate with the network device) at different times and at different positions within the effective coverage range of the signals of the wireless signal transceiver equipment using the wireless network signals transmitted by the wireless signal transceiver equipment. Accordingly, in some embodiments, the location information corresponding to each MAC address includes one or more pieces (e.g., records) of latitude information and longitude information. Each of the one or more pieces of latitude information and longitude information corresponds to (i) the latitude information and the longitude information for the location of a different terminal when the terminal accessed the Internet using the wireless network signals provided by the wireless signal transceiver equipment, or (ii) the latitude information and the longitude information for the location of a particular terminal at the different times that the particular terminal accessed the Internet using the wireless network signals provided by the wireless signal transceiver equipment.

At 220, a database is updated with the MAC address and the location information. In some embodiments, a database indicating locations associated with MAC addresses is configured to store the acquired MAC address and location information. For example, the database can be configured to store a mapping of the acquired location information to the acquired MAC address. The server can configure the database with the MAC address and the location information. In the even that a packet is received, the packet can include the MAC address and signal strength. A location of the mobile terminal can be determined by a positioning module. The server can configure, or otherwise update, the database with the MAC address and the location information at predetermined times (e.g., at predetermined time intervals), in response to receiving the MAC address and the location information corresponding to the MAC address, the like, or any combination thereof.

The collected MAC address and corresponding location information can be used as a basis for determining the latitude and longitude corresponding to each MAC address so as to obtain a relationship between MAC addresses and corresponding locations stored in the database of MAC addresses and locations.

Figure 3:
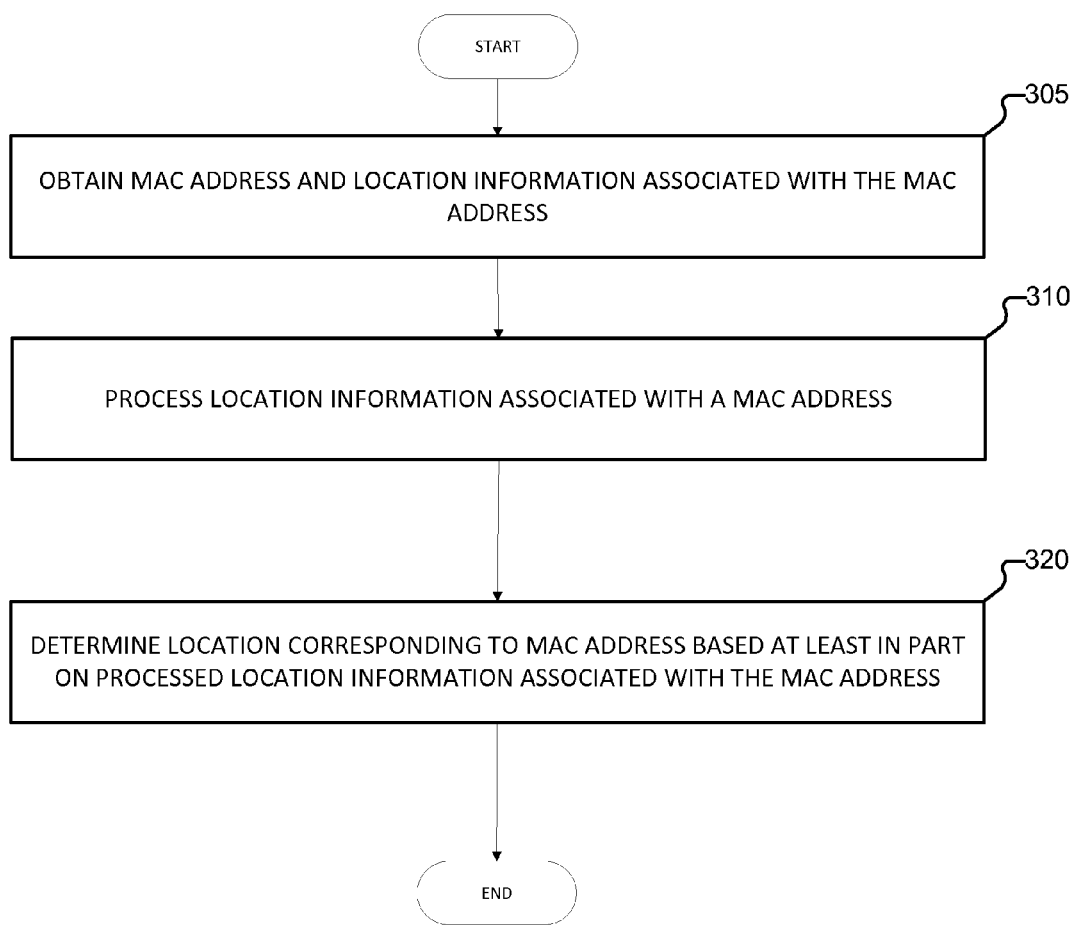
FIG. 3 is a flowchart of generating a record in a database indicating locations associated with MAC addresses using a collected MAC address and corresponding location information as a basis for determining a latitude and a longitude corresponding to each MAC address according to various embodiments of the present application.

FIG. 3 is a flowchart of generating a record in a database indicating locations associated with MAC addresses using a collected MAC address and corresponding location information as a basis for determining a latitude and a longitude corresponding to each MAC address according to various embodiments of the present disclosure.

Referring to FIG. 3, a method 300 for generating a record in a database indicating locations associated with MAC addresses using a collected MAC address and corresponding location information is provided. In some embodiments, process 300 is implemented by device 1000 of FIG. 10. In some embodiments, process 300 is implemented by system 1100 of FIG. 11. In some embodiments, 220 of FIG. 2 is implemented by method 300.

In some embodiments, using each collected MAC address and corresponding location information as a basis for determining the latitude and the longitude corresponding to each MAC address includes 305-320.

At 305, a MAC address and its associated location information are obtained. In some embodiments, the MAC address and the location information are obtained from specific fields in the header and/or payload of a specially marked packet received at the server. In some embodiments, in the event that a device is connected to a WiFi network, the mobile device can execute a map application that can determine a location (e.g., positioning) of the mobile device. The mobile phone can retrieve the MAC address associated with the WiFi networks (e.g., using a packet received during communication with the WiFi network, such as a router). The map application can store the MAC address and corresponding location information in a cache on the mobile device. In some embodiments, the mobile device can update a database (e.g., a local database, a remote database hosted by a server, or the like). For example, the mobile device can update the database at predefined time intervals. As another example, the mobile device can update the database at predefined events (e.g., such as network or Internet access events).

At 310, location information associated with a MAC address is processed. In some embodiments, the server processes the location information associated with the MAC address. In some embodiments, the database (e.g., a processor operatively connected with the database) processes the location information associated with the MAC address. The location information corresponding to each collected MAC address can be processed to obtain one or more pieces of MAC address latitude and longitude data corresponding to each MAC address.

In some embodiments, each piece of MAC address latitude and longitude data includes the MAC address and the latitude and longitude (e.g., the latitude information and the longitude information) corresponding to the MAC address. The latitude information and longitude information correspond to the latitude and longitude of the location of a device that accessed a network (e.g., a location of the device when the device connected to the Internet) using a network device corresponding to the MAC address. The location information corresponding to each MAC address can include one or more pieces of latitude information and longitude information. Each piece of latitude information and longitude information corresponds to the latitude information and longitude information for the location of a different terminal when the terminal accessed the network using the wireless network signals provided by the wireless signal transceiver equipment, or the latitude information and longitude information for the location of the particular terminal at the different times that the particular terminal accessed the Internet (e.g., went online) using the wireless network signals provided by the wireless signal transceiver equipment.

The location information of each MAC address can be processed. One or more pieces of MAC address latitude and longitude data corresponding to each MAC address can be obtained. The one or more pieces of MAC address latitude and longitude data corresponding to each MAC address can be obtained based on the processing of the location information of each MAC address. For example, any piece of latitude and longitude information in the location information of a MAC address undergoes processing to obtain one piece of MAC address latitude and longitude data corresponding to the MAC address. In some embodiments, a representative location corresponding to a particular MAC address is determined based at least in part on the one or more pieces of MAC address latitude and longitude data corresponding to the particular MAC address. In some embodiments, the representative location corresponding to a particular MAC address can be determined according to an average of the one or more pieces of MAC address latitude and longitude data corresponding to the particular MAC address. In some embodiments, the representative location corresponding to a particular MAC address can be determined according to a median of the one or more pieces of MAC address latitude and longitude data corresponding to the particular MAC address. In some embodiments, the representative location corresponding to a particular MAC address can be determined according to a location that occurs most frequently among the one or more pieces of MAC address latitude and longitude data corresponding to the particular MAC address. In some embodiments, the representative location corresponding to a particular MAC address can be determined according to a location that was most recently recorded (e.g., collected), or that otherwise relates to a most recent Internet access event, among the one or more pieces of MAC address latitude and longitude data corresponding to the particular MAC address.

In some embodiments, a format of the data (e.g., the MAC address information and location information corresponding to a MAC address) is "[mac, lat, long]," wherein "mac" represents the MAC address, "lat" represents latitude, and "long" represents longitude. The database indicating locations associated with MAC addresses can store a record according to such a format.

In some embodiments, each piece of MAC address latitude and longitude data includes the number of days on which the particular piece of MAC address latitude and longitude data has occurred. The number of days on which the particular piece of MAC address latitude and longitude data has occurred can correspond to a number of days on which the MAC address latitude and longitude data is recorded (e.g., collected). Each piece of MAC address latitude and longitude data can include a signal strength at the time of occurrence (e.g., a signal strength of a signal communicated by a wireless signal transceiver equipment that is received by a terminal). The data format can be "[mac, lat, long, signal, log_days]." "Signal" indicates signal strength, and "log_days" indicates the number of days on which an access of the Internet occurred. In such a format, if a piece of MAC address latitude and longitude data occurs on a day (e.g., any day during a predetermined collection time prior to the current time), the MAC address latitude and longitude data is recorded as having one occurrence day. In some embodiments, regardless of how many times the MAC address latitude and longitude data occurs on a particular day, the MAC address latitude and longitude will be recorded as having one occurrence day. For example, in the event that 30 days of data are collected, if a piece of MAC address latitude and longitude data occurs five times on day 3, once on day 5, and three times on day 6, then the number of occurrence days recorded for this piece of IP address latitude and longitude is three days.

In some embodiments, the number of occurrence days associated with the one or more pieces of MAC address latitude and longitude data corresponding to each MAC address can be collected and the pieces of MAC address latitude and longitude data that have a number of occurrence days that is less than a predetermined threshold number of days can be filtered from the one or more pieces of MAC address latitude and longitude data corresponding to each MAC address. For example, a piece of MAC address latitude and longitude data occurred on only one day. The piece of MAC address latitude and longitude data that occurred on only one day can be deemed to likely be abnormal data because it falls below the threshold number five. Accordingly, such data can be deleted, or otherwise filtered out. In some embodiments, the threshold number of days can be configured by a user, a server (e.g., a server that provides context-based content to a terminal), or the like. The threshold number of days can be determined according to a statistical analysis of the one or more pieces of MAC address latitude and longitude data that determines data that is deemed to be outliers according to a statistically relevant measure.

At 320, a location corresponding to a MAC address can be determined. The location corresponding to the MAC address can be determined based at least in part on the processed location information associated with the MAC address. In some embodiments, the one or more pieces of MAC address latitude and longitude data corresponding to a MAC address serve as a basis for determining the latitude and longitude corresponding to a MAC address. As an example, the location corresponding to a particular MAC address determined based at least in part on the one or more pieces of MAC address latitude and longitude data can be a representative location corresponding to the particular MAC address.

Figure 4:
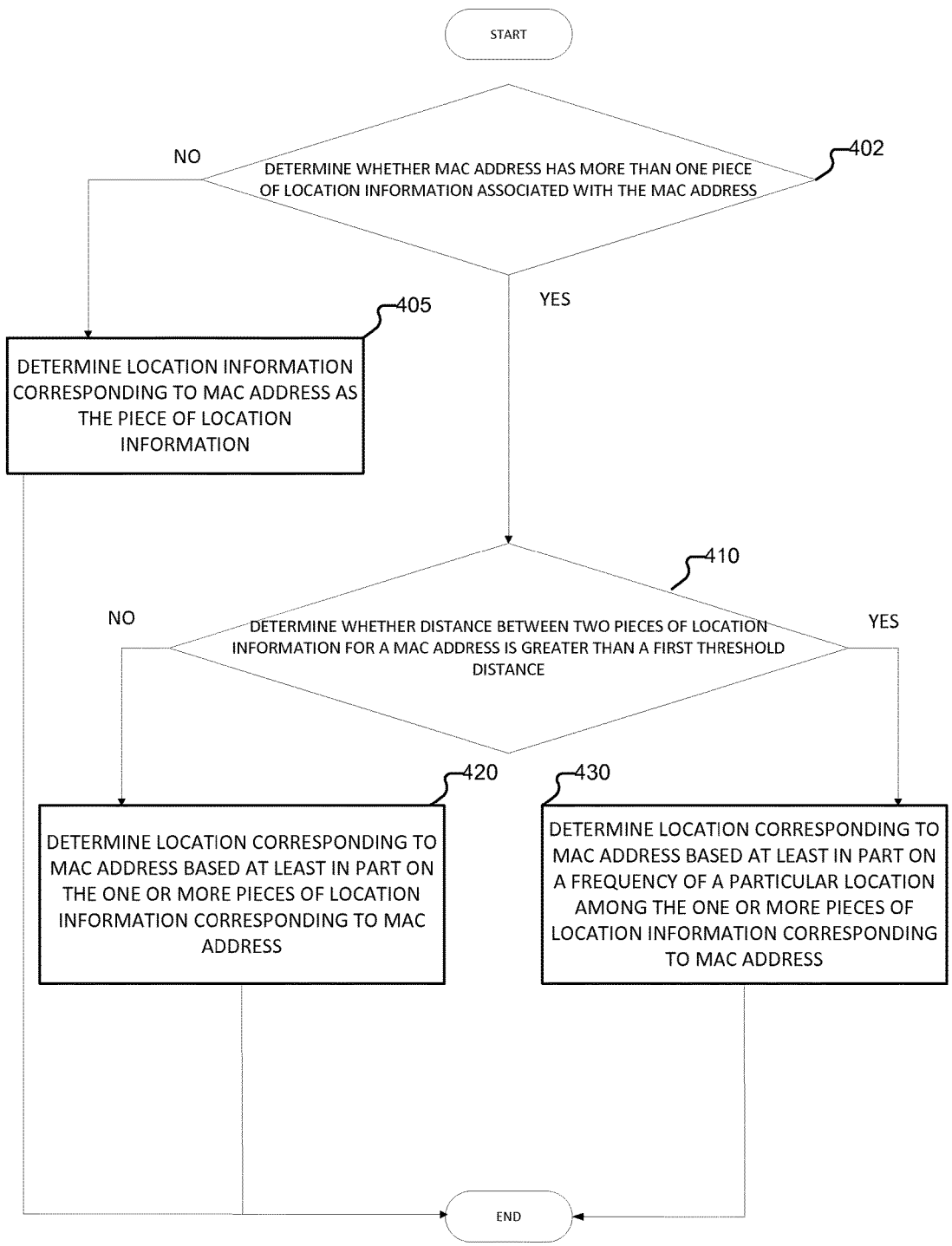
FIG. 4 is a flowchart of determining a latitude and a longitude corresponding to a MAC address according to various embodiments of the present application.

FIG. 4 is a flowchart of determining a latitude and a longitude corresponding to a MAC address according to various embodiments of the present disclosure.

Referring to FIG. 4, a method 400 for determining a latitude and a longitude corresponding to a MAC address is provided. In some embodiments, process 400 includes a method for determining the latitude and longitude corresponding to each MAC address according to the one or more pieces of MAC address latitude and longitude data corresponding to each MAC address. In some embodiments, process 400 is implemented by device 1000 of FIG. 10. In some embodiments, process 400 is implemented by system 1100 of FIG. 11. In some embodiments, 320 of FIG. 3 is implemented by method 400.

At 402, it is determined whether a MAC address has a single piece of location information or multiple pieces of location information. If the MAC address has a single piece of location information, at 405, that piece of location information is determined to be the location information corresponding to the MAC address. The location information corresponding to the MAC address can be used to determine a current location of a terminal (e.g., that accesses the Internet using a network device with the MAC address). The location information corresponding to the MAC address can be provided as output or used to provide a location-based service.

If the MAC address has multiple pieces of corresponding location information, at 410, a determination is made as to whether a distance between any two pieces of location information corresponding to a MAC address is greater than a first threshold distance. In some embodiments, a server determines whether the distance between two pieces of location information corresponding to a MAC address is greater than the first threshold distance. The server can determine whether the distance between the locations corresponding to all combinations of two pieces of MAC address latitude and longitude data among the multiple pieces of MAC address latitude and longitude data corresponding to each MAC address exceeds the first threshold distance.

In some embodiments, a degree to which the multiple pieces of MAC address latitude and longitude data corresponding to a particular MAC address are clustered is measured based at least in part on whether a distance between any two pieces of location information corresponding to the MAC address is greater than a first threshold distance. Specifically, it is whether the distance between the locations corresponding to each two pieces of latitude and longitude data among multiple pieces of latitude and longitude data corresponding to each MAC address exceeds the first threshold distance. If so, the locations of the multiple pieces of latitude and longitude data corresponding to the MAC address are clustered. In some embodiments, the degree to which the multiple pieces of MAC address latitude and longitude data corresponding to a particular MAC address are clustered is measured so as to exclude abnormal data (e.g., outliers) such as a mobile WiFi. In some embodiments, a mobile WiFi has a decentralized position and thus a position according to a MAC address cannot be determined according to the MAC address for a device accessing the Internet using a mobile WiFi.

The first threshold distance can be configured automatically by the server or manually by a user (e.g., based on settings for context-based content such as location-based content). In some embodiments, the first threshold distance is set according to specific conditions. For example, wireless network signal transmitting equipment with wireless network signal coverage ranges of about 50 meters is relatively common (e.g., in the case of wireless routers). Accordingly, the first threshold distance can be set at 100 meters.

In the event that none of the distances between the locations corresponding to each two pieces (e.g., any combination of two pieces) of MAC address latitude and longitude data among the multiple pieces of MAC address latitude and longitude data corresponding to each MAC address is greater than the first threshold distance, then at 420, a location corresponding to a particular MAC address can be determined based at least in part on the multiple pieces of location information corresponding to the MAC address. For example, the server can determine that a location corresponding to a particular MAC address is an average of the multiple pieces of (collected) location information corresponding to a particular MAC address. In some embodiments, the server can determine that a location corresponding to a particular MAC address is an average of the multiple pieces of (collected) location information corresponding to a particular MAC address after the multiple pieces of (collected) location information corresponding to a particular MAC address have been filtered (e.g., processed) to remove outlier location information.

In some embodiments, in the event that none of the distances between the locations corresponding to each two pieces (e.g., any combination of two pieces) of MAC address latitude and longitude data among the multiple pieces of MAC address latitude and longitude data corresponding to each MAC address is greater than the first threshold distance, an average of the latitude information and the longitude information of the multiple pieces of MAC address latitude and longitude data is determined to be the latitude information (e.g., latitude coordinate) and longitude information (e.g., longitude coordinate) corresponding to the particular MAC address. As an example, the location corresponding to a particular MAC address can be determined to be the average of the pieces of location information corresponding to the particular MAC address in the event that none of the distances between any two pieces of the location information corresponding to the particular MAC address is greater than the first threshold distance. The determined location corresponding to the particular MAC address can be stored in the database indicating locations associated with MAC addresses.

In some embodiments, in the event that none of the distances between the locations corresponding to each two pieces of MAC address latitude and longitude data among the multiple pieces of MAC address latitude and longitude data corresponding to each MAC address exceeds a first threshold distance, then the locations at which the multiple pieces of MAC address latitude and longitude data occur corresponding to the MAC address can be determined to be relatively clustered. Accordingly, respective averages of the latitudes and longitudes among the multiple pieces of MAC address latitude and longitude data can be determined and deemed to correspond to the location corresponding to the MAC address.

In contrast, in the event that the distance between locations corresponding to any two pieces of MAC address latitude and longitude data among the multiple pieces of MAC address latitude and longitude data corresponding to each MAC address is greater than the first threshold distance, then at 430, a location corresponding to a particular MAC address can be determined based at least in part on a frequency of a particular location of the multiple pieces of location information corresponding to the MAC address. For example, a location corresponding to a particular MAC address can be determined to correspond to the location at which the Internet is accessed in connection with the MAC address most often.

In some embodiments, at 430, the latitude and longitude corresponding to a particular MAC address is determined according to a threshold quantity of pieces of MAC address latitude and longitude data having the most occurrence days among the multiple pieces of MAC address latitude and longitude data.

For example, in the event that the distance between locations corresponding to two pieces of MAC address latitude and longitude data among the multiple pieces of MAC address latitude and longitude data exceeds a first threshold distance, then the locations at which the multiple pieces of MAC address latitude and longitude data occur corresponding to the MAC address are deemed to be relatively dispersed (e.g., not clustered). The latitude information and longitude information (e.g., the latitude and longitude coordinates) corresponding to the MAC address can be determined according to a threshold quantity of pieces of MAC address latitude and longitude data having the most occurrence days among the multiple pieces of MAC address latitude and longitude data.

The threshold quantity of pieces of MAC address latitude and longitude data can be configured by the server, by a user (e.g., based on settings for context-based content such as location-based content), or the like. The threshold quantity of pieces can be configured according to signal strength, time (e.g., time of a connection), or the like.

As an example, in the event that the threshold quantity of pieces of MAC address latitude and longitude data is three, then the latitude and longitude corresponding to a particular MAC address can be determined according to the three pieces of MAC address latitude and longitude data having the most occurrence days among the multiple pieces of MAC address latitude and longitude data corresponding to the particular MAC address. The multiple pieces of MAC address latitude and longitude data corresponding to a particular MAC address can be ranked according to a number of occurrence days in order to extract the pieces of MAC address latitude and longitude data with the three most occurrence days corresponding to the particular MAC address. Then the latitude and longitude corresponding to the particular MAC address can be determined according to the number of occurrence days of the three pieces of MAC address latitude and longitude data having the most occurrence days and the distances between the locations corresponding thereto.

In some embodiments, the distance between the MAC address latitude and longitude data of the extracted pieces of MAC address latitude and longitude data (e.g., the threshold quantity of pieces of MAC address latitude and longitude data having the most occurrence days among the multiple pieces of MAC address latitude and longitude data that are extracted from the multiple pieces of MAC address latitude and longitude data) and the locations corresponding to the other pieces of MAC address latitude and longitude data can be determined. In the event that pieces of MAC address latitude and longitude data having a distance from the location corresponding to the MAC address latitude and longitude data with the most occurrence days does not exceed a second threshold distance, the longitude data and the latitude data of the MAC address latitude and longitude data with the most occurrence days are weighted and averaged using the respective number of occurrence days as weights. The obtained average latitude and average longitude can be determined to be the latitude and longitude for the MAC address.

For example, suppose at 430 the pieces of MAC address latitude and longitude data with the three most occurrence days extracted for a certain MAC address are r1 (the most occurrence days), r2, and r3, wherein r1=[mac, lat1, long1], r2=[mac, lat2, long2], and r3=[mac, lat3, long3]. The second threshold distance can be the same as the first threshold distance. Suppose the first threshold distance and the second threshold distance are both 100 meters. The distances between r1 and the locations corresponding to the other two pieces of MAC address latitude and longitude data (e.g., r2 and r3) can be separately calculated. If the distance that is obtained between the locations corresponding to r1 and r2 is within (e.g., less than or equal to) 100 meters, and the distance between the locations corresponding to r1 and r3 is less than 100 meters, then the latitude data and the longitude data in r1, r2, and r3 are weighted and averaged using the number of occurrence days of r1, r2, and r3, respectively, as weights. The number of occurrence days of r1, r2, and r3 can be represented as n1, n2, and n3, respectively. The average latitude and average longitude can be computed as (n1/(n1+n2+n3)*r1+(n2/(n1+n2+n3)*r2+n3/(n1+n2+n3)*r3)/(number of pieces of latitude and longitude data). In this example, the number of pieces of latitude and longitude data is 3. The obtained average latitude and average longitude are determined to be the latitude and longitude corresponding to the particular MAC address. In contrast, if the distance that is obtained between the locations corresponding to r1 and r2 is within (e.g., less than or equal to) 100 meters, and the distance between the locations corresponding to r1 and r3 is greater than 100 meters, then the latitude data and the longitude data of r1 and r2 are weighted and averaged using the number of occurrence days of r1 and r2, respectively, as weights (e.g., n1 and n2, respectively). The average latitude and average longitude can be computed as (n1/(n1+n2)*r1+(n2/(n1+n2)*r2)/(number of pieces of latitude and longitude data). In this example, the number of pieces of latitude and longitude data is 2 because the distance between the locations corresponding to r1 and r3 is greater than 100 meters. For example, only the pieces of latitude data and the longitude data for which the distance between the pieces of latitude data and longitude data having the most occurrence days (e.g., the latitude data and longitude data having the greatest frequency of occurrence) is less than the second distance threshold are used in determining the weighted average of the latitude information and the longitude information corresponding to a particular MAC address. The obtained average latitude and average longitude can be determined to be (e.g., deemed as being) the latitude and longitude corresponding to the MAC address. In the event that the distances obtained for both r1 and r2, and r1 and r3 are greater than the second threshold distance (e.g., 100 meters), then the latitude and longitude of r1 which has the most occurrence days can be determined to be (e.g., deemed as being) the latitude and longitude corresponding to the MAC address.

In some embodiments, after the latitude and longitude corresponding to each collected MAC address is determined, a confidence level of the location corresponding to each MAC address can be determined.

For example, a confidence level of the location corresponding to each MAC address can be determined according to the signal strength corresponding to one or more pieces of MAC address latitude and longitude data corresponding to the MAC address. For each MAC address, the signal strength corresponding to each piece of MAC address latitude and longitude data corresponding to the MAC address can be used as a basis for determining the confidence level of each piece of MAC address latitude and longitude data. For example, let $I_{signal}$ be the signal strength of the data obtained at a location. The confidence level for MAC address latitude and longitude data with a signal strength of $-50\ \text{dbm} < I_{signal} < 0\ \text{dbm}$ is set at 1 (the strongest confidence level). The confidence level for MAC address latitude and longitude data with a signal strength of $-70\ \text{dbm} < I_{signal} < -50\ \text{dbm}$ is set at 2. The confidence level for MAC address latitude and longitude data with a signal strength of $-90\ \text{dbm} < I_{signal} < -70\ \text{dbm}$ is set at 3, and so on. In some embodiments, the confidence level with the highest number of occurrences among the confidence levels of the one or more pieces of MAC address latitude and longitude data corresponding to the MAC address is determined as the confidence level of the location corresponding to the MAC address. For example, a most frequent confidence level associated with the one or more pieces of MAC address latitude and longitude information corresponding to the MAC address is determined to be the confidence level of the location information corresponding to the MAC address. The value of the confidence level can be inversely related to the degree of confidence. For example, a confidence level of 1 can correspond to the strongest degree of confidence, a confidence level of 2 can correspond to the second strongest degree of confidence, and the like.

In some embodiments, in the event that a database indicating locations associated with MAC addresses is used (e.g., to look-up, or otherwise determine, the location of a terminal), and the confidence level that is looked up for the location corresponding to the MAC address (e.g., of the wireless signal transceiver equipment associated with a terminal connecting to the Internet) is relatively high (e.g., above a confidence level threshold), then the location corresponding to the MAC address is further determined in combination with the pre-configured correspondences bank of IP addresses and locations.

Referring back to 130 of FIG. 1, in the event that the database (e.g., the database indicating locations associated with MAC addresses) includes the MAC address, then the location corresponding to the MAC address included in the database is determined to be (e.g., deemed as) the current location of the terminal. For example, if the database indicating locations associated with MAC addresses includes the MAC address of the network device (e.g., the wireless signal transceiver equipment) associated with the terminal connected to the Internet (e.g., the network device that the terminal uses to access the Internet), then the location corresponding to the MAC address (e.g., the latitude information and longitude information corresponding to the MAC address) is looked up in the database indicating locations associated with MAC addresses. The latitude information and longitude information corresponding to the MAC address is determined to be the latitude and longitude of the current location of the terminal.

In the event that the database indicating locations associated with MAC addresses does not have the MAC address, then the location of the terminal can be determined according to the IP address of the terminal.

Figure 5:
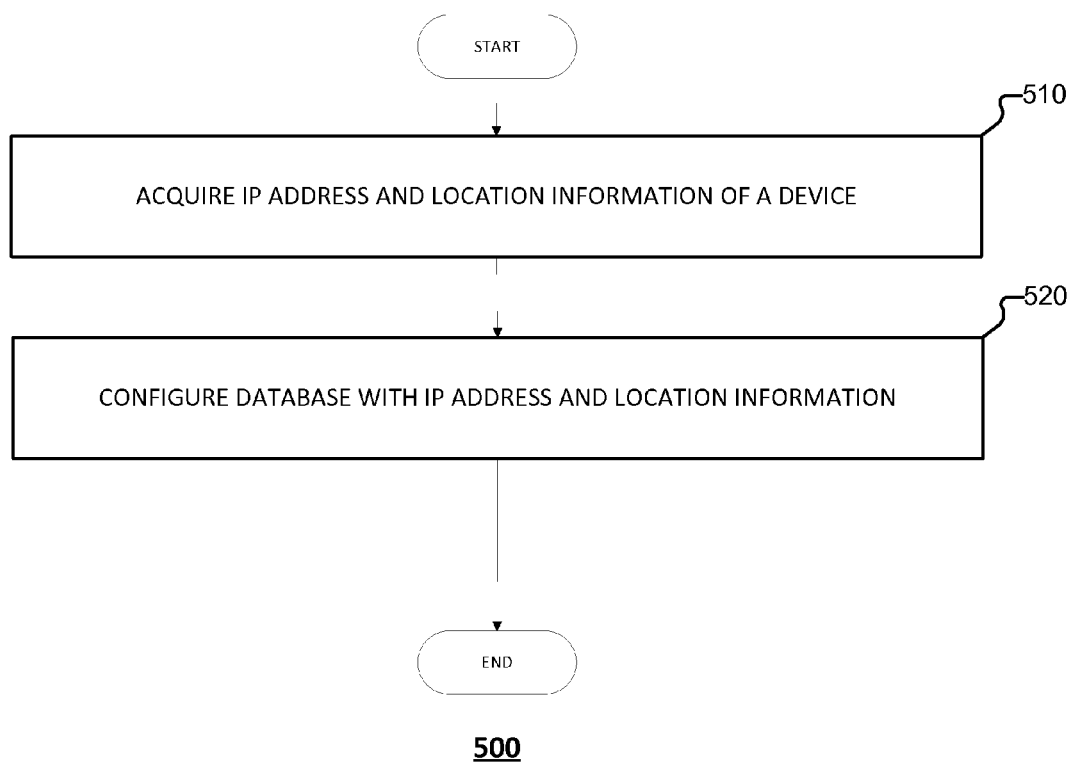
FIG. 5 is a flowchart of pre-configuring a database indicating locations associated with Internet Protocol (IP) addresses according to various embodiments of the present application.

FIG. 5 is a flowchart of pre-configuring a database indicating locations associated with IP addresses according to various embodiments of the present application.

Referring to FIG. 5, a method 500 for configuring a database indicating locations associated with IP addresses is provided. In some embodiments, the method 500 is implemented by device 1000 of FIG. 10. In some embodiments, the method 500 is implemented by system 1100 of FIG. 11.

At 510, an IP address of a device and location information of a device (e.g., location information corresponding to the IP address) are acquired. The device can be a terminal accessing the Internet, or the like. In some embodiments, a server acquires (e.g., collects) the IP address and the location information corresponding to the IP address. The server can acquire the IP address and the location information of the device in connection with a network access event. For example, the network access event can be a terminal accessing the Internet, browsing a web page, communicating with a network device, etc. As an example, the IP addresses can correspond to the IP addresses of wireless signal transceiver equipment (e.g., wireless routers, wireless switches, etc.) through which the terminal communicates, and can be attached to the header or payload of a message in a specified field. The location information corresponding to an IP address can include the latitude information (e.g., latitude coordinates) and longitude information (e.g., longitude coordinates), and can be included in a packet header or payload. The location information associated with a particular IP address can correspond to the location of a terminal at the time that the Internet is accessed via the particular IP address (e.g., when a terminal accesses the Internet, or otherwise goes online, via the IP address). The location information associated with the IP address can be used to determine the latitude and longitude of the location of the terminal.

In some embodiments, in the event that a mobile device connects to the Internet through (e.g., using) wireless network signals (such as but not limited to WiFi signals) transmitted by a wireless signal transceiver equipment, the IP address of the wireless signal transceiver equipment that is transmitting the wireless network signals can be acquired. For example, in the event that a mobile device accesses the Internet, the mobile device sends a packet to the networking equipment, which attaches its IP address to the packet header or payload and then forwards the packet to its destination. Thus, the IP address of the wireless signal transceiver device (e.g., network equipment) that the mobile device uses to access the Internet can be acquired by analyzing the packet header or payload downstream from the wireless signal transceiver device, such as when the packet reaches its destination server.

In some embodiments, location information stored in association with a particular IP address can have a valid time of data. The valid time of data can be a threshold amount of time that the location information associated with a particular IP address is valid. In some embodiments, the IP addresses and corresponding location information of a device can be collected within a predetermined collection time period prior to a current time (e.g., the time at which location of the terminal is determined using the database in connection with a location-based service). The IP addresses and corresponding location information can be collected in connection with network communications that occurred within a predetermined collection period of time before the current time. For example, the IP addresses and location information of each IP address can be collected for the most recent 30 days. Because IP addresses can be dynamically allocated, the locations (e.g., latitudes and longitudes) associated with devices using IP addresses may differ at different network access times. In some embodiments, one or more pieces of location information (e.g., latitude information and longitude information) are collected for each IP address. For example, the location information of each IP address includes one or more pieces of latitude information and longitude information. In some embodiments, each piece of latitude information and longitude information associated with an IP address corresponds to the latitude and longitude of a terminal at a different time when the terminal accessed the Internet (e.g., went online) via the IP address.

At 520, a database is updated with the IP address and the location information. In some embodiments, a database indicating locations associated with IP addresses is configured to store the acquired IP address and location information. For example, the database can be configured to store a mapping of the acquired location information to the acquired IP address. The server can configure the database with the IP address and the location information. The server can configure, or otherwise update, the database with the MAC address and the location information at predetermined times (e.g., at predetermined time intervals), in response to receiving the MAC address and the location information corresponding to the MAC address, the like, or any combination thereof. In some embodiments, in the event that a device is connected to a WiFi network, the mobile device can execute a map application that can determine a location (e.g., positioning) of the mobile device. The mobile phone can retrieve the MAC address associated with the WiFi networks (e.g., using a packet received during communication with the WiFi network, such as a router). The map application can store the MAC address and corresponding location information in a cache on the mobile device. In some embodiments, the mobile device can update a database (e.g., a local database, a remote database hosted by a server, or the like). For example, the mobile device can update the database at predefined time intervals. As another example, the mobile device can update the database at predefined events (e.g., such as network or Internet access events). The server can configure the database when the server receives an update (e.g., comprising MAC address information and location information) from the mobile device.

The collected IP address and corresponding location information can be used as a basis for determining the latitude and longitude corresponding to each IP address so as to obtain a relationship between IP addresses and corresponding locations stored in the database of IP addresses and locations. The database can be used to determine a location of a terminal according to the IP address of the terminal. The IP address of the terminal can be determined based on a message (e.g., an access request) communicated to a server.

Figure 6:
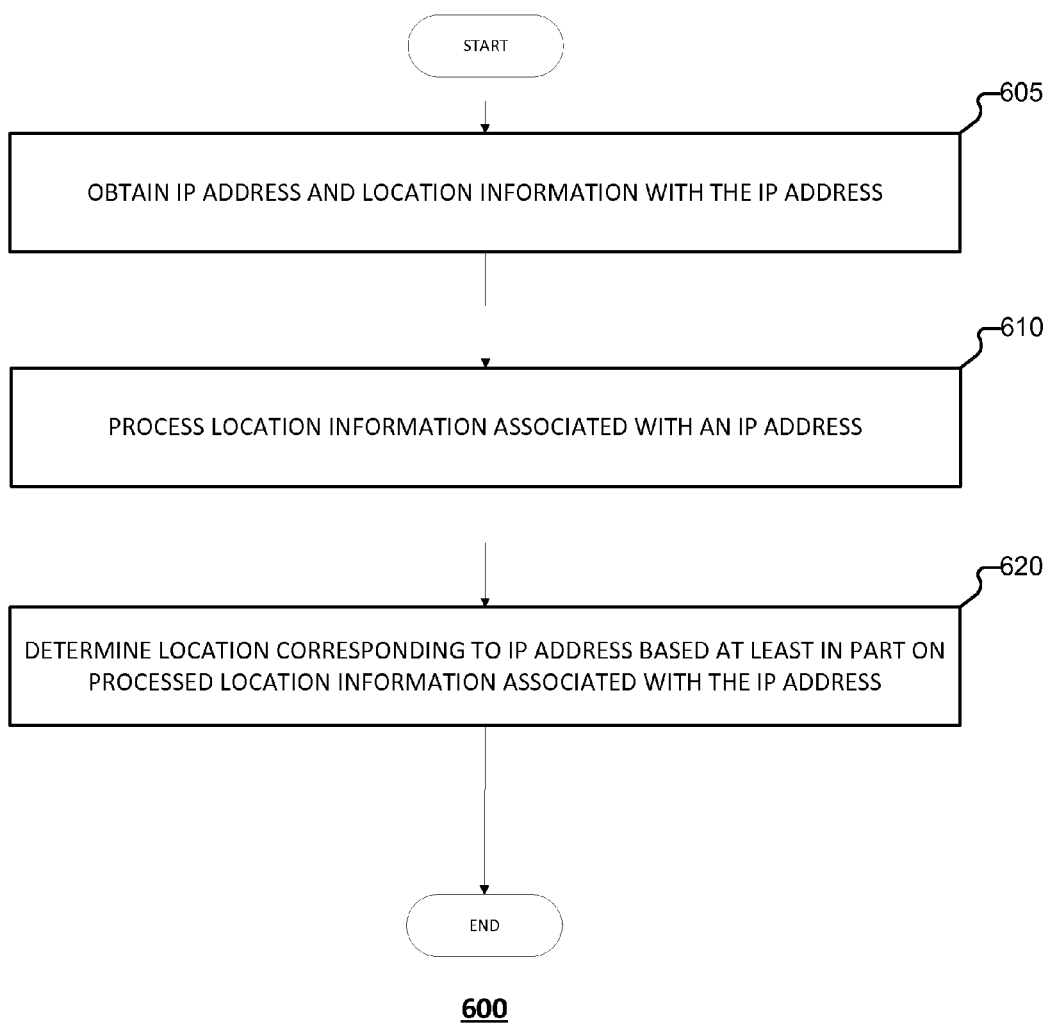
FIG. 6 is a flowchart of determining a latitude and a longitude corresponding to an IP address according to various embodiments of the present application.

FIG. 6 is a flowchart of determining a latitude and a longitude corresponding to an IP address according to various embodiments of the present disclosure.

Referring to FIG. 6, a method 600 for determining a location corresponding to an IP address is provided. In some embodiments, process 600 is implemented by device 1000 of FIG. 10. In some embodiments, process 600 is implemented by system 1100 of FIG. 11. In some embodiments, 520 of FIG. 5 is implemented by method 600.

In some embodiments, using the location information of each collected IP address as a basis for determining the latitude and longitude corresponding to each IP address includes 605-620. Each collected IP address can correspond to an IP address of a device when the device connects to the Internet.

At 605, an IP address and its associated location information are obtained. In some embodiments, the IP address and the location information are obtained from specific fields in the header and/or payload of a specially marked packet received at the server.

At 610, location information associated with an IP address is processed. In some embodiments, the server processes the location information associated with the IP address. In some embodiments, the database (e.g., a processor operatively connected with the database) processes the location information associated with the IP address. The collected IP addresses and the location information of each IP address are processed to obtain one or more pieces of IP address latitude and longitude data corresponding to each collected IP address.

In some embodiments, the geographic coordinate information included in the location information of each collected IP address can be processed to obtain IP address geographic coordinate data corresponding to each IP address. Because the location information of each IP address can include one or more pieces of geographic coordinate information, one or more pieces of IP address geographic coordinate data corresponding to a particular IP address can be obtained by processing the location information associated with the particular IP address. Each piece of IP address geographic coordinate data can include the IP address and a set of longitudinal and latitudinal data associated with the IP address. For example, any one piece of geographic coordinate information in the location information associated with an IP address can be processed to obtain a piece of IP address geographic coordinate data corresponding to the IP address. The format of the piece of IP address geographic coordinate data corresponding to the IP address data can be [ip, lat, long], wherein "ip" represents the IP address, "lat" represents latitude, and "long" represents longitude. The location information (e.g., the latitudinal data and the longitudinal data) associated with an IP address can be processed according to a predetermined rule based on a desired precision. For example, the last three digits after the decimal point can be retained (e.g., the three places following the decimal point can be captured) in the longitudinal data and in the latitudinal data to ensure reasonable error for the actual geographic location corresponding to each set of geographic coordinate data (e.g., 0.01 degree geographic coordinate error within 1 km).

In some embodiments, the determining of a location corresponding to an IP address, or otherwise configuring the database indicating locations associated with IP addresses can include deleting the pieces of IP address latitude and longitude data for which a number of occurrence days in the IP address latitude and longitude data obtained through processing is less than a threshold number of days. For example, a piece of IP address geographic coordinate data occurs only on one day. The piece of IP address geographic coordinate data can be deemed likely to be abnormal data because it falls below the threshold number five. Accordingly, such data can be deleted or otherwise filtered out. In some embodiments, the threshold number of days can be configured by a user, a server (e.g., a server that provides context-based content to a terminal), or the like. The threshold number of days can be determined according to a statistical analysis of the one or more pieces of IP address latitude and longitude data that determines data that is deemed to be outliers according to a statistically relevant measure.

At 620, a location corresponding to an IP address can be determined. The location corresponding to the IP address can be determined based at least in part on the processed location information associated with the IP address. In some embodiments, the one or more pieces of IP address latitude and longitude data corresponding to an IP address serve as a basis for determining the latitude and longitude corresponding to an IP address. As an example, the location corresponding to a particular IP address determined based at least in part on the one or more pieces of IP address latitude and longitude data can be a representative location corresponding to the particular IP address.

Figure 7:
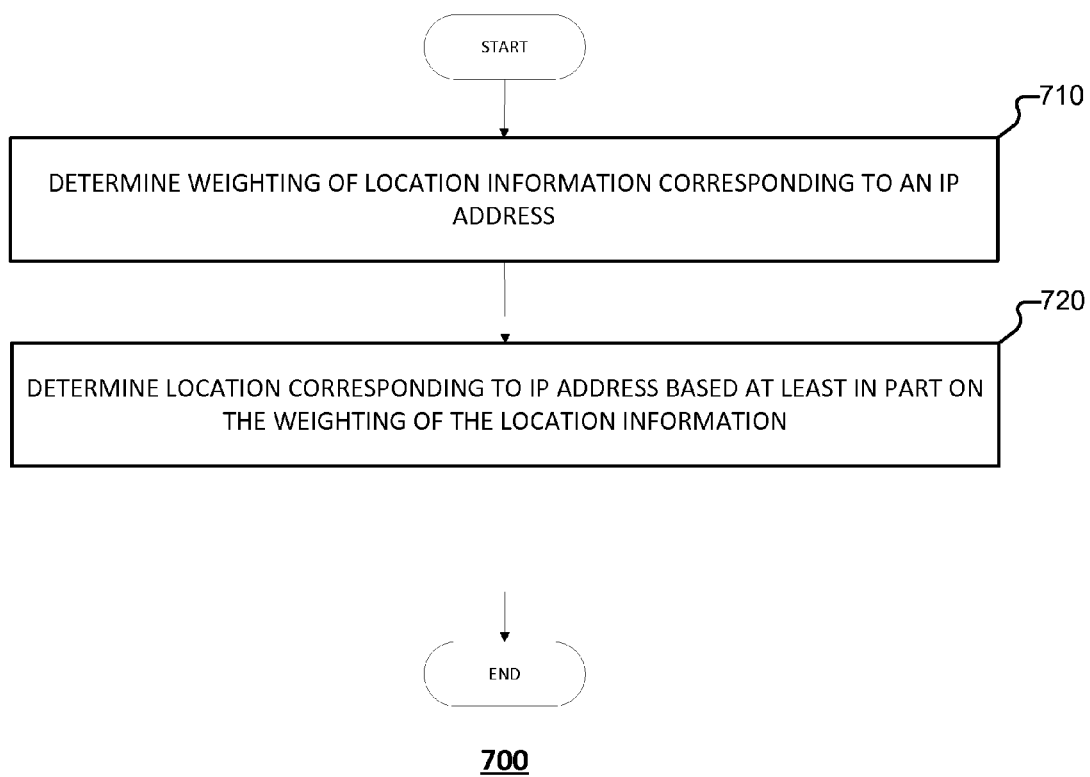
FIG. 7 is a flowchart of determining a latitude and a longitude corresponding to an IP address according to various embodiments of the present application.

FIG. 7 is a flowchart of determining a latitude and a longitude corresponding to an IP address according to various embodiments of the present disclosure.

Referring to FIG. 7, a method 700 for determining a latitude and a longitude corresponding to an IP address is provided. In some embodiments, process 700 is implemented by device 1000 of FIG. 10. In some embodiments, process 700 is implemented by system 1100 of FIG. 11. In some embodiments, 620 of FIG. 6 is implemented by method 700.

In some embodiments, the determining of the latitude and longitude corresponding to each IP address according to the one or more pieces of IP address latitude and longitude data corresponding to each IP address includes 710 and 720.

At 710, a weighting of location information associated with an IP address is determined. In some embodiments, a server (e.g., a server operatively connected with the database indicating locations associated with IP addresses) determines a weighting of the location information. For an IP address, the weight of each piece of IP address latitude and longitude data corresponding to the IP address is determined. For example, a weight of each piece of IP address geographic coordinate data among the one or more pieces of IP address geographic coordinate data corresponding to each collected IP address is determined.

In some embodiments, if only one piece of IP address geographic coordinate data exists for an IP address, then a weighting of location information associated with an IP address does not need to be determined. For example, the piece of IP address geographic coordinate data corresponding to the IP address can be deemed to be the location corresponding to the IP address.

In some embodiments, the weight of each piece of IP address geographic data can be determined according to the time at which the piece of IP address geographic data is collected (e.g., the time of the network access event, which can be a terminal accessing the Internet, browsing a web page, communicating with a network device, or the like). For example, a piece of IP address geographic data that is collected relatively more recently (e.g., a piece of IP address geographic data associated with a more recent network event) can be weighted relatively higher than a piece of IP address geographic data that is collected relatively less recently (e.g., a piece of IP address geographic data associated with a less recent network event). In some embodiments, because IP addresses can be dynamically located, a piece of IP address geographic data can become dated. The weight of each piece of IP address geographic data can be determined based at least in part on a time associated with the piece of IP address geographic data.

In some embodiments, the distance between the IP address latitude and longitude data of the extracted pieces of IP address latitude and longitude data (e.g., the threshold quantity of pieces of IP address latitude and longitude data having the most occurrence days among the multiple pieces of IP address latitude and longitude data that are extracted from the multiple pieces of IP address latitude and longitude data) and the locations corresponding to the other pieces of IP address latitude and longitude data can be determined. In the event that pieces of IP address latitude and longitude data having a distance from the location corresponding to the IP address latitude and longitude data with the most occurrence days does not exceed a third threshold distance, the longitude data and the latitude data of the IP address latitude and longitude data with the most occurrence days are weighted and averaged using the respective number of occurrence days as weights. The obtained average latitude and average longitude can be determined to be the latitude and longitude for the IP address.

For example, the pieces of IP address latitude and longitude data with the three most occurrence days extracted for a certain IP address are p1 (the most occurrence days), p2 and p3, wherein p1=[IP, lat1, long1], p2=[IP, lat2, long2], and p3=[IP, lat3, long3]. The third threshold distance can be the same as the first threshold distance. Suppose the first threshold distance and the third threshold distance are both 100 meters. The distances between p1 and the locations corresponding to the other two pieces of IP address latitude and longitude data (e.g., p2 and p3) can be separately calculated. If the distance that is obtained between the locations corresponding to p1 and p2 is within (e.g., less than or equal to) 100 meters, and the distance between the locations corresponding to p1 and p3 is less than 100 meters, then the latitude data and the longitude data in p1, p2, and p3 are weighted and averaged using the number of occurrence days of p1, p2, and p3, respectively, as weights. The number of occurrence days of p1, p2, and p3 can be represented as n1, n2, and n3, respectively. The average latitude and average longitude can be computed as (n1/(n1+n2+n3)*p1+(n2/(n1+n2+n3)*p2+n3/(n1+n2+n3)*p3)/(number of pieces of latitude and longitude data). In this example, the number of pieces of latitude and longitude data is 3. The obtained average latitude and average longitude are determined to be the latitude and longitude corresponding to the particular IP address. In contrast, if the distance that is obtained between the locations corresponding to p1 and p2 is within (e.g., less than or equal to) 100 meters, and the distance between the locations corresponding to p1 and p3 is greater than 100 meters, then the latitude data and the longitude data of p1 and p2 are weighted and averaged using the number of occurrence days of p1 and p2, respectively, as weights (e.g., n1 and n2, respectively). The average latitude and average longitude can be computed as (n1/(n1+n2)*p1+(n2/(n1+n2)*p2)/(number of pieces of latitude and longitude data). In this example, the number of pieces of latitude and longitude data is 2 because the distance between the locations corresponding to p1 and p3 is greater than 100 meters. For example, only the pieces of latitude data and the longitude data for which the distance between the pieces of latitude data and longitude data having the most occurrence days (e.g., the latitude data and longitude data having the greatest frequency of occurrence) is less than the third distance threshold are used in determining the weighted average of the latitude information and the longitude information corresponding to a particular IP address. The obtained average latitude and average longitude can be determined to be (e.g., deemed as being) the latitude and longitude corresponding to the IP address. In the event that the distances obtained for both p1 and p2, and p1 and p3 are greater than the third threshold distance (e.g., 100 meters), then the latitude and longitude of p1 which has the most occurrence days can be determined to be (e.g., deemed as being) the latitude and longitude corresponding to the IP address.

At 720, a location associated with an IP address is determined based at least in part on the weighting of the location information. In some embodiments, a server determines the location associated with a particular IP address. The determined location can be stored in the database indicating the location associated with the IP address. In some embodiments, the location associated with a particular IP address can be determined contemporaneously with providing a terminal accessing the Internet using the particular IP address with a context-based (e.g., location-based) service. The location associated with an IP address can be determined using the weight of IP address geographic coordinate data corresponding to a collected IP address (e.g., using the weight of each piece of IP address geographic coordinate data among the one or more pieces of IP address geographic coordinate data corresponding to each collected IP address).

Figure 8:
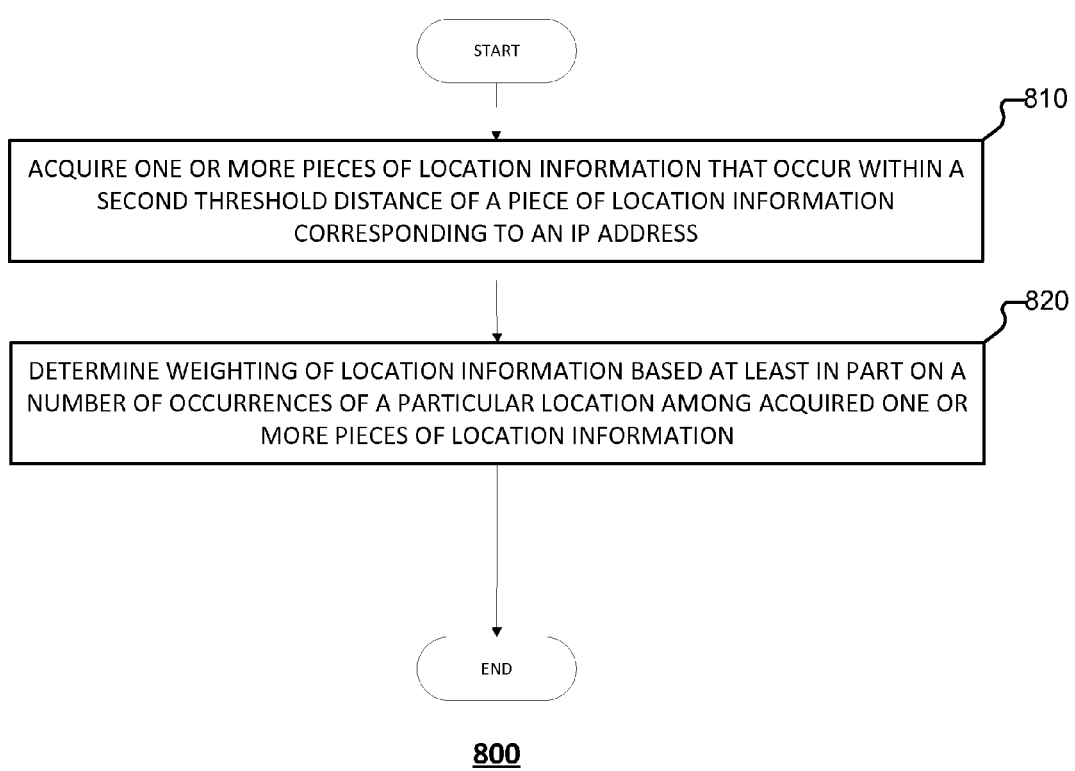
FIG. 8 is a flowchart determining a weight of each piece of IP address latitude and longitude data corresponding to an IP address according to various embodiments of the present application.

FIG. 8 is a flowchart determining a weight of each piece of IP address latitude and longitude data corresponding to an IP address.

Referring to FIG. 8, a method 800 for determining a weight of each piece of IP address latitude and longitude data corresponding to an IP address is provided. In some embodiments, process 800 is implemented by device 1000 of FIG. 10. In some embodiments, process 800 is implemented by system 1100 of FIG. 11. In some embodiments, 710 of FIG. 7 is implemented by method 800.

In some embodiments, the determining, for each IP address, of the weight of each piece of IP address latitude and longitude data corresponding to a particular IP address includes 810 and 820.

At 810, one or more pieces of location information that occur within a fourth threshold distance of a piece of location information associated with an IP address are acquired. For example, one or more pieces of IP address latitude and longitude data that occur within a predetermined range (e.g., the fourth threshold distance) of the location corresponding to each piece of IP address latitude and longitude data corresponding to the IP address are acquired.

For example, the fourth threshold distance can be 2 kilometers and a server can acquire all the IP address geographic coordinate data occurring within 2 kilometers of locations corresponding to geographic coordinates in each piece of IP address geographic coordinate data corresponding to the IP address. The one or more pieces of IP address latitude and longitude data corresponding to a particular IP address that occur within 2 kilometers of every other piece of IP address latitude and longitude data corresponding to the particular IP address are acquired.

At 820, a weighting of location information is determined based at least in part on a number of occurrences of a particular location among the acquired one or more pieces of location information. In some embodiments, the server (e.g., a server operatively connected to the database indicating locations associated with IP addresses) can determine the weighting of the location information. The weight of each piece of IP address latitude and longitude data corresponding to a particular IP address is determined according to a number of occurrence days of each piece of IP address latitude and longitude data corresponding to the IP address within a predetermined time period and the number of occurrence days of one or more pieces of IP address latitude and longitude data occurring within a predetermined range of a corresponding location. The predetermined range can correspond to the fourth threshold distance. In some embodiments, the weight of each piece of IP address latitude and longitude data corresponding to a particular IP address is determined based on a number of days for which the Internet is accessed using the particular IP address from a particular location.

In some embodiments, the number of occurrence days of each piece of IP address latitude and longitude data among one or more pieces of IP address latitude and longitude data occurring within a predetermined range of locations corresponding to each of the pieces of IP address latitude and longitude data is summed. The predetermined range can correspond to the fourth threshold distance. The total number of days corresponding to the IP address latitude and longitude data is obtained, and the number of occurrence days of the IP address latitude and longitude data is counted. The total number of days and the number of occurrence days corresponding to each piece of IP address latitude and longitude data are weighted according to a predetermined weight. The weight for each piece of IP address latitude and longitude data is obtained.

In some embodiments, the number of occurrence days are counted for the one or more pieces of IP address latitude and longitude data corresponding to each collected IP address so as to obtain the number of days for all pieces of IP address latitude and longitude data. The occurrences of one piece of IP address latitude and longitude data during one day (e.g., any one day in a predetermined collection time period prior to the current time) are recorded as one occurrence for the piece of data. Moreover, regardless of the number of times the piece of IP address latitude and longitude data occurs on a particular day, all instances of the piece of IP address latitude and longitude data are recorded as one occurrence day for that piece of IP address latitude and longitude data.

For example, the number of occurrence days for all IP address latitude and longitude data within two kilometers of each piece of IP address latitude and longitude data (including for this piece of IP address latitude and longitude data) may be acquired and summed, and the total number of days corresponding to this piece of IP address latitude and longitude data is obtained. Moreover, the number of occurrence days of this piece of IP address latitude and longitude data within a predetermined time period (e.g., during the seven days prior to the current time) is acquired. The corresponding total number of days and number of occurrence days are weighted according to a predetermined weight. For example, the corresponding total number of days and the number of occurrence days can be weighted according to a weight of 1:4. The weighted value is taken as the weight of a particular piece of IP address latitude and longitude data.

Referring back to 720 of FIG. 7, the latitude and longitude in the IP address latitude and longitude data with the largest weight among the one or more pieces of IP address latitude and longitude data corresponding to the IP address can be determined to be the latitude and longitude corresponding to the IP address.

Referring back to 710 of FIG. 7, in the event that the weight of each piece of IP address latitude and longitude data among the one or more pieces of IP address latitude and longitude data corresponding to the IP address is determined, the piece of IP address latitude and longitude data with the greatest weight therein can be determined, and at 720, the latitude and longitude in the IP address latitude and longitude data with the largest weight can be determined to be the latitude and longitude corresponding to the IP address, (e.g., the latitude and longitude of the location corresponding to the IP address). In some embodiments, the latitude and longitude in the IP address latitude and longitude data associated with a particular IP address with the largest weight can be stored in the database indicating locations associated with IP addresses as the location information (e.g., the latitude and longitude) associated with the particular IP address.

Referring back to 520 of FIG. 5, the determined latitude and longitude corresponding to each IP address and the previously acquired IP address base database are merged and processed to configure the database indicating locations associated with IP addresses.

For example, the determined latitude and longitude corresponding to each IP address is compared to the previously acquired IP address base database (e.g., an existing version of the database indicating locations associated with IP addresses). IP addresses that do not exist in the IP address base database and the latitudes and longitudes corresponding thereto are added to the database of IP addresses and locations that provides relationships between IP addresses and locations. In the event that an IP address exists in the IP address base database, a determination is made as to whether the zone of the latitude and longitude corresponding to the IP address is the same as the zone of the latitude and longitude corresponding to the IP address in the IP address base database. In the event that the zone of the latitude and longitude corresponding to the IP address is the same as the zone of the latitude and longitude corresponding to the IP address in the IP address base database, then the IP address and the latitude and longitude corresponding thereto can be added to the database indicating locations associated with IP addresses. In the event that the zone of the latitude and longitude corresponding to the IP address is not the same as the zone of the latitude and longitude corresponding to the IP address in the IP address base database, then the IP address and the latitude and longitude corresponding thereto in the IP address base database can be added to the database indicating locations associated with IP addresses so as to replace location information associated with an IP address. In some embodiments, the determined latitude and longitude corresponding to each IP address and the previously acquired IP address base database can be merged into a database indicating locations associated with IP addresses.

For example, the IP address base database could be an operator IP database (e.g., a commercially available service that provides an indication of a location corresponding to a particular IP address). The operator IP database can provide latitudes and longitudes corresponding to IP addresses and the cities corresponding to the locations of the IP addresses. For example, the latitude and longitude corresponding to an IP address as determined at 520 described above can be [lata, longa], where "lata" represents the latitude information (e.g., latitude coordinate), and "longa" represents the longitude information (e.g., longitude coordinate). In the operator IP database, the latitude and longitude corresponding to the IP address and the city corresponding to the location can be [latb, longb, cityb], where "cityb" represents the city corresponding to the location of the IP address. A determination can be made as to whether the latitude information and longitude information [lata, longa] are in the zone of cityb (e.g., using the limits of the city indicated by the latitude and longitude). If the location associated with the latitude information and longitude information is within the zone of cityb, then [lata, longa] can be determined to be (e.g., deemed as) the latitude information and longitude information corresponding to the IP address. The latitude information and longitude information [lata, longa] can be added to the database indicating locations associated with IP addresses. If the location associated with the latitude information and longitude information [lata, longa] is not in the zone of cityb, then [latb, longb] can be determined to be (e.g., deemed as) the latitude and longitude corresponding to the IP address and added to the database indicating locations associated with IP addresses.

In some embodiments, in the event that the database indicating locations associated with IP addresses is configured, the database is updated at predetermined intervals. Because IP addresses are dynamically allocated, the location corresponding to an IP address can change, or an IP address that was not collected and thus does not exist in the database can subsequently be collected. Therefore, the database indicating locations associated with IP addresses can be updated at predetermined intervals. In some embodiments, the predetermined length of time is determined according to specific conditions. For example, the database indicating locations associated with IP addresses can be updated every 10 minutes.

Figure 9:
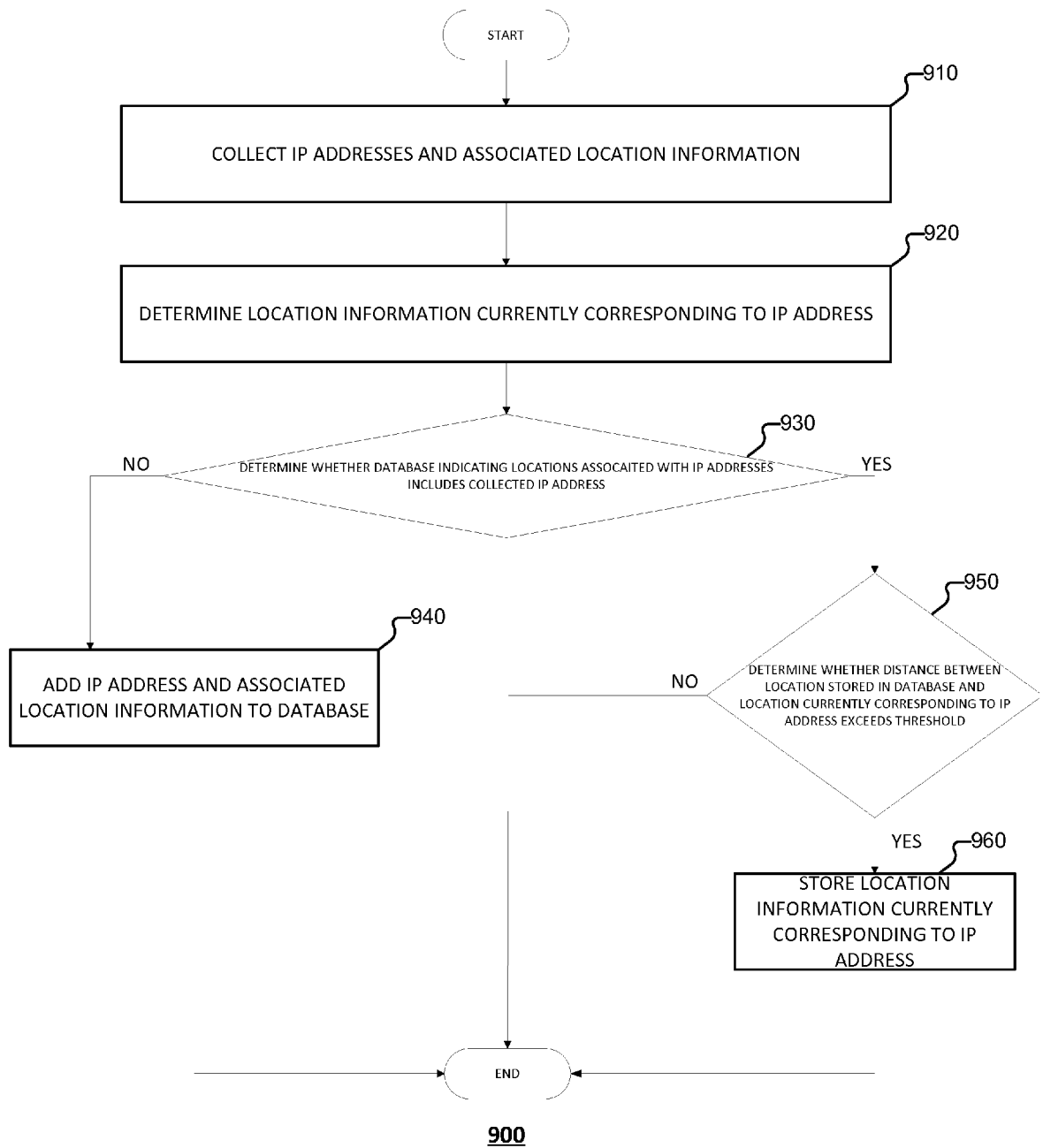
FIG. 9 is a flowchart of updating a database indicating locations associated with IP addresses at predetermined intervals according to various embodiments of the present application.

FIG. 9 is a flowchart of updating a database indicating locations associated with IP addresses at predetermined intervals according to various embodiments of the present application.

Referring to FIG. 9, a method 900 for updating a database indicating locations associated with IP addresses is provided. In some embodiments, process 900 is implemented by device 1000 of FIG. 10. In some embodiments, process 900 is implemented by system 1100 of FIG. 11.

At 910, an IP address and location information associated with the IP address are collected. In some embodiments, a server collects (e.g., acquires) the IP address and associated location information. As an example, the IP addresses which have occurred in the current day and the location information of each IP address are collected.

At 920, location information currently corresponding to a particular IP address is determined. In some embodiments, the server determines location information that currently corresponds to a particular IP address. The latitude information and the longitude information included in the location information of each IP address having an occurrence time that is closest to the current time can be determined to be the latitude information and longitude information currently corresponding to the IP address. For example, the latest latitude and longitude information of each collected IP address is determined as the latitude and longitude currently corresponding to the IP address.

At 930, a determination is made as to whether the database indicating locations associated with IP addresses includes location information associated with a particular IP address. In some embodiments, the server determines whether the database indicating locations associated with IP addresses includes location information (e.g., the latitude information and the longitude information) associated with the particular IP address. The server can determine whether the database indicating locations associated with IP addresses includes the particular IP address (e.g., whether the database stores a record for the IP address). For example, a determination is made as to whether the IP address can be looked up in the database indicating locations associated with IP addresses.

In the event that the database indicating locations associated with IP addresses does not include a particular IP address, then at 940, the particular IP address and location information associated therewith can be included in the database. In some embodiments, in the event that the database does not include a particular IP address, an IP address and the latitude information and the longitude information currently corresponding to the particular IP address can be stored in the database.

In contrast, in the event that the database indicating locations associated with IP addresses includes a particular IP address, then at 950, a determination can be made as to whether a distance between location information stored in the database and location information currently corresponding to the particular IP address exceeds a threshold. The threshold can correspond to the fourth threshold distance. In the event that the database indicating the locations associated with IP addresses includes the particular IP address, then a determination can be made as to whether the distance between the latitude and longitude corresponding to the IP address stored in the database indicating the locations associated with IP addresses and the latitude and longitude currently corresponding to the particular IP address exceeds the fourth threshold distance.

In the event that the distance between the location stored in the database and the location currently corresponding to the particular IP address exceeds the fourth threshold distance, then at 960, the location information currently corresponding to the particular IP address in the database indicating locations associated with IP addresses is stored. In the event that the distance between the latitude and longitude corresponding to the particular IP address in the database indicating locations associated with IP addresses and the latitude and longitude currently corresponding to the particular IP address exceeds a threshold distance, then the latitude information and longitude information corresponding to the IP address in the database indicating locations associated with IP addresses is replaced with the latitude information and longitude information currently corresponding to the particular IP address.

In contrast, in the event that the distance between the location stored in the database and the location currently corresponding to the particular IP address does not exceed the fourth threshold distance, then there is no need to perform processing (e.g., the database indicating locations associated with the IP address can be unchanged in relation to the particular IP address). For example, in the event that the distance between the latitude and longitude corresponding to the particular IP address in the database indicating locations associated with IP addresses and the latitude and longitude currently corresponding to the particular IP address does not exceed the fourth threshold distance, then there is no need to perform processing in relation to the location information corresponding to the particular IP address stored in the database. For example, the database indicating locations associated with IP addresses can maintain the latitude and longitude that originally corresponded to the IP address.

Referring back to 160 of FIG. 1, in the event that the database indicating locations associated with IP addresses includes the IP address, then at 160, the location corresponding to the IP address can be determined to be the location of the terminal. In other words, if the database indicating locations associated with IP addresses includes the IP address of the terminal, then the location (e.g., the latitude and the longitude) corresponding to the IP address is looked up in the database indicating locations associated with IP addresses. The current location of the terminal is determined to be the latitude and longitude of the location corresponding to the IP address stored in the database indicating locations associated with IP addresses.

In the event that the database indicating locations associated with IP addresses does not have the IP address, then the positioning of the terminal can be determined to have failed. For example, the method 100 can end without a location being provided for the terminal. In other words, the latitude and longitude corresponding to the IP address of the terminal could not be found in the database indicating locations associated with IP addresses. Accordingly, the positioning of the terminal has failed.

Figure 10:
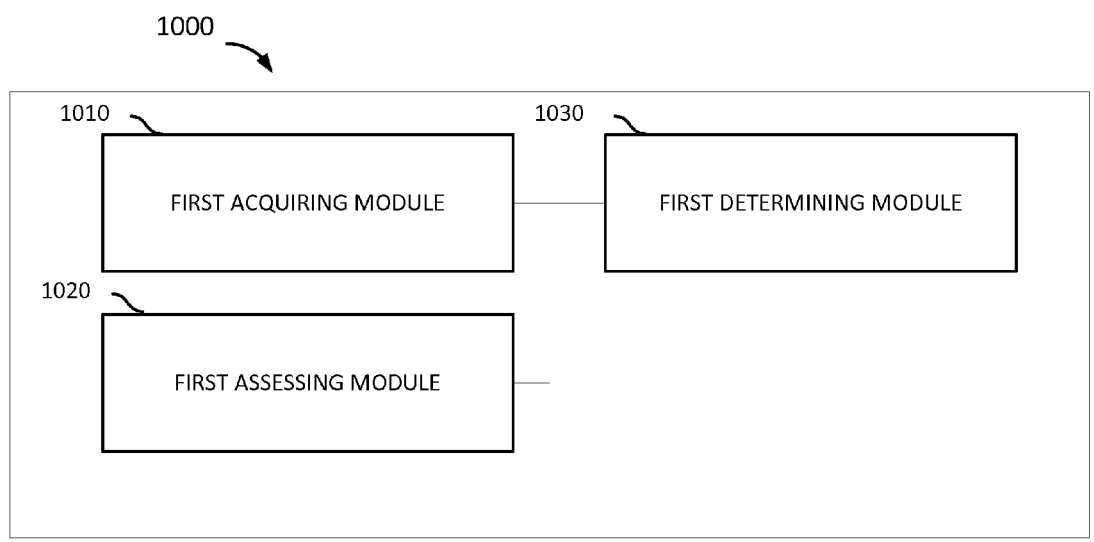
FIG. 10 is a diagram of a device for determining a terminal location according to various embodiments of the present application.

FIG. 10 is a diagram of a device for determining a terminal location according to various embodiments of the present application.

Referring to FIG. 10, a device 1000 for determining a location of a terminal is provided. In some embodiments, the device 1000 implements method 100 of FIG. 1, method 200 of FIG. 2, method 300 of FIG. 3, method 400 of FIG. 4, method 500 of FIG. 5, method 600 of FIG. 6, method 700 of FIG. 7, method 800 of FIG. 8, method 900 of FIG. 9, or any combination thereof. In some embodiments, the device 1000 can be implemented in system 1100 of FIG. 11. For example, the device 1000 can correspond to server 1120 of FIG. 11, database 1140 of FIG. 11, the like, or any combination thereof.

In some embodiments, the device 1000 corresponds to a server. The server can be a server that provides a location-based service to a client terminal. For example, the server can correspond to a server that hosts a website or a web service. In some embodiments, the device 1000 corresponds to a server that is connected to another server, which provides a location-based service to a client terminal.

In some embodiments, the device 1000 corresponds to a client terminal.

In some embodiments, the device 1000 includes a first acquiring module 1010, a first assessing module 1020, and a first determining module 1030.

The first acquiring module 1010 can be configured to acquire the MAC address of network equipment (e.g., wireless signal transceiver equipment) when the terminal connects to the Internet. The terminal can connect to the Internet by receiving wireless network signals transmitted by the network equipment (e.g., the wireless signal transceiver equipment).

The first assessing module 1020 can be configured to determine whether the database indicating locations associated with MAC addresses includes the MAC address corresponding to the terminal.

The first determining module 1030 can be configured to determine the location corresponding to the MAC address included in the database (e.g., the database indicating locations associated with MAC addresses) to be the current location of the terminal in the event that the database includes the MAC address corresponding to the terminal.

In some embodiments, the device 1000 includes a second acquiring module, a second assessing module, and a second determining module.

The second acquiring module can be configured to acquire the IP address of the terminal in the event that the database indicating locations associated with MAC addresses does not include the MAC address corresponding to the terminal.

The second assessing module can be configured to determine whether the database indicating locations associated with IP addresses includes the IP address corresponding to the terminal.

The second determining module can be configured to determine the location corresponding to the IP address as the current location of the terminal.

The device 1000 can further include a first collecting module. The first collecting module can be configured to collect MAC addresses and location information corresponding thereto. The location information can include the latitudes and longitudes of locations of equipment (e.g., a device) that accesses the Internet when the equipment connects to the Internet using the wireless signal transceiver equipment corresponding to the MAC address.

The device 1000 can further include a third determining module. The third determining module can be configured to use each collected MAC address and location information corresponding thereto as a basis for determining the latitude and longitude corresponding to each MAC address so as to obtain (e.g., configure) a database indicating locations associated with MAC addresses.

In some embodiments, the third determining module includes a first processing module and a first latitude and longitude determining module.

The first processing module can be configured to process the location information corresponding to each collected MAC address to obtain one or more pieces of MAC address latitude and longitude data corresponding to each MAC address.

The first latitude and longitude determining module can be configured to use the one or more pieces of MAC address latitude and longitude data corresponding to each MAC address as a basis for determining the latitude and longitude corresponding to each MAC address.

In some embodiments, the first latitude and longitude determining module includes a distance assessing module and a latitude and longitude determining sub module.

The distance assessing module can be configured to determine whether the distance between the locations corresponding to each of two pieces of MAC address latitude and longitude data among the one or more pieces of MAC address latitude and longitude data corresponding to each MAC address exceeds a first threshold distance.

The latitude and longitude determining sub module can be configured to determine that the average of the latitudes and longitudes of the one or more pieces of MAC address latitude and longitude data corresponds to the latitude and longitude corresponding to the MAC address in the event that none of the distances between the locations corresponding to each of two pieces of MAC address latitude and longitude data among the one or more pieces of MAC address latitude and longitude data exceeds a first threshold distance.

In some embodiments, the latitude and longitude sub determining module can further be configured to determine that a predetermined quantity of MAC address latitude and longitude data with the greatest number of occurrence days among the one or more pieces of MAC address latitude and longitude data serves as a basis for determining the latitude and longitude corresponding to the MAC address in the event that a distance between the locations corresponding to any two pieces of MAC address latitude and longitude data among the one or more pieces of MAC address latitude and longitude data exceeds a first predetermined distance.

In some embodiments, the device 1000 may further include a confidence level determining module. The confidence level module can be configured to use the signal strength corresponding to each MAC address as a basis for determining the confidence level of the latitude and longitude corresponding to each MAC address.

The device 1000 can further include a second collecting module. The second collecting module can be configured to collect IP addresses and the location information of each IP address. The location information of the IP addresses can include latitudes and longitudes of the locations when the Internet is accessed via the IP addresses.

The device 1000 can further include a fourth determining module. The fourth determining module can be configured to determine the latitude and longitude corresponding to each IP address according to the location information of each collected IP address.

The device 1000 can further include a margining module. The merging module can be configured to merge and process the determined latitude and longitude corresponding to each IP address and the previously acquired IP address base database to obtain (e.g., configured) a database indicating locations associated with IP addresses.

In some embodiments, the device 1000 can include a fourth determining module. The fourth determining module can include a second processing module and a second latitude and longitude determining module.

The second processing module can be configured to process each collected IP address and the location information of each IP address to obtain one or more pieces of IP address latitude and longitude data corresponding to each collected IP address.

The second latitude and longitude determining module can be configured to use the one or more pieces of IP address latitude and longitude data corresponding to each collected IP address as a basis for determining the latitude and longitude corresponding to each IP address.

In some embodiments, the second determining module can further include a weight determining module and a second latitude and longitude determining sub module.

The weight determining module can be configured to determine, for each IP address, the weight of each piece of IP address latitude and longitude data corresponding to the IP address.

The second latitude and longitude determining sub module can be configured to determine the latitude and longitude in the IP address latitude and longitude data with the largest weight among the one or more pieces of IP address latitude and longitude data corresponding to the IP address as the latitude and longitude corresponding to the IP address.

In some embodiments, the weight determining module can further include an acquiring sub-module and a weight determining sub-module.

The acquiring sub-module can be configured to acquire the one or more pieces of IP address geographic coordinate data that occur within a predetermined range of locations corresponding to each piece of IP address geographic coordinate data corresponding to the IP address.

The weight determining sub-module can be configured to determine the weight of each piece of IP address latitude and longitude data corresponding to the IP address according to the number of occurrence days of each piece of IP address latitude and longitude data corresponding to the IP address within a predetermined time period and the number of occurrence days of one or more pieces of IP address latitude and longitude data occurring within a predetermined range of a corresponding location.

In some embodiments, device 1000 can further include an updating module to configure (e.g., update) a database indicating locations associated with IP addresses. The updating module can be configured to update the database indicating locations associated with IP addresses at predetermined intervals. The updating module may further include a collecting sub-module, a determining sub-module, a first assessing sub-module, and an adding sub-module.

The collecting sub-module can be configured to collect IP addresses which have occurred in the current day and the location information of each IP address.

The determining sub-module can be configured to determine the latitude and longitude in the location information of each IP address having an occurrence time that is closest to the current time as the latitude and longitude currently corresponding to the IP address.

The first assessing sub-module can be configured to determine whether the database indicating locations associated with IP addresses includes the IP address.

The adding sub-module can be configured to add the correspondence of the IP address to the currently corresponding latitude and longitude to the database indicating locations associated with IP addresses in the event that the database does not include the IP address.

In some embodiments, the updating module further includes a second assessing sub-module and a substituting sub-module.

The second assessing sub-module can be configured to determine whether the distance between the location corresponding to the IP address in the database indicating locations associated with IP addresses and the latitude and longitude currently corresponding to the IP address exceeds a threshold distance (e.g., the fourth threshold distance) in the event that the database indicating locations associated with IP addresses includes the IP address.

The substituting sub-module can be configured to, if the distance between the location corresponding to said IP address in said correspondences database of IP addresses and locations and the latitude and longitude currently corresponding to said IP address exceeds a second predetermined distance, can be configured to substitute the latitude and longitude corresponding to the IP address in the database indicating locations associated with IP addresses with the latitude and longitude currently corresponding to the IP address in the event that the distance between the location corresponding to the IP address in the database indicating locations associated with IP addresses and the latitude and longitude currently corresponding to the IP address exceeds a threshold distance (e.g., the fourth threshold distance).

Figure 11:
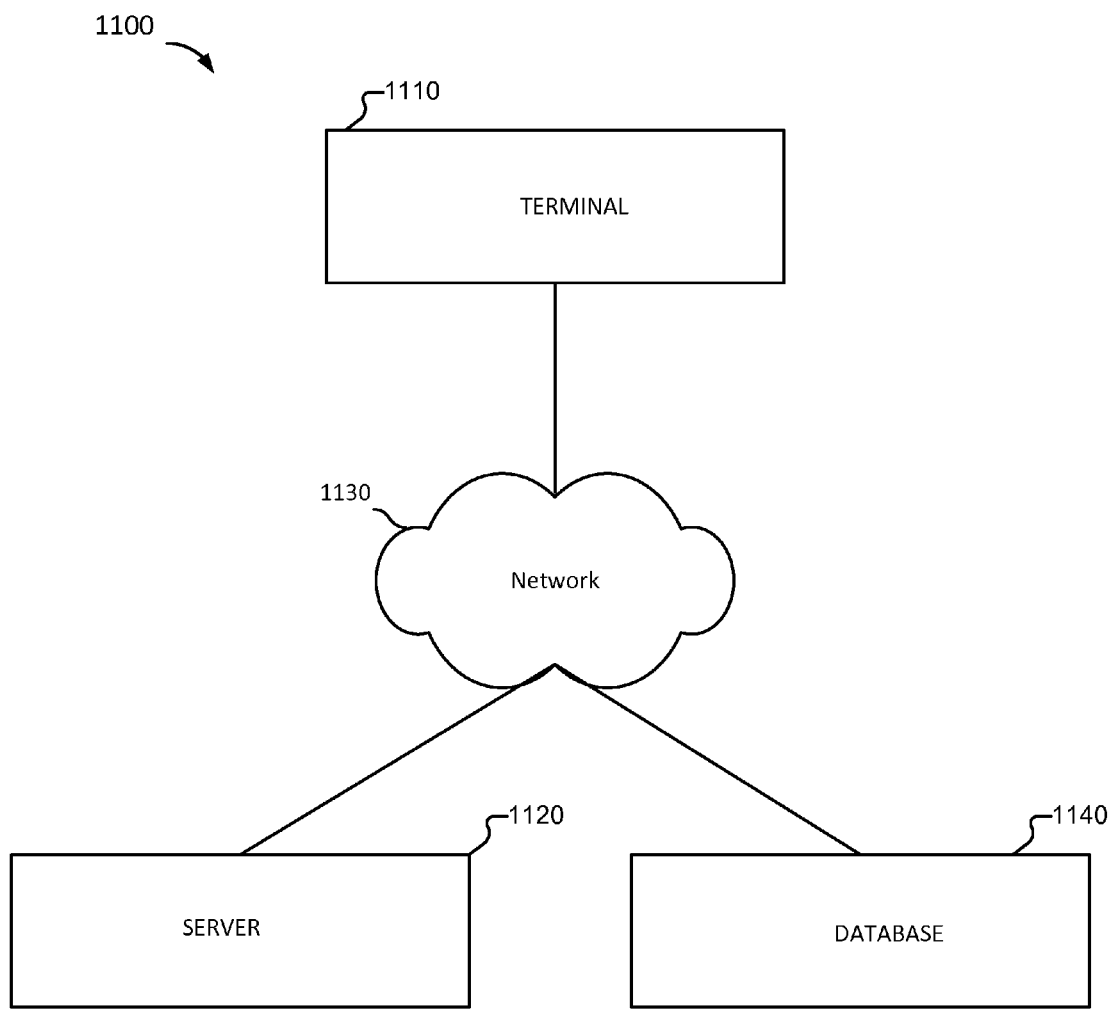
FIG. 11 is a structural block diagram of a system for determining a terminal location according to various embodiments of the present application.

FIG. 11 is a structural block diagram of a system for determining a terminal location according to various embodiments of the present application.

Referring to FIG. 11, a system 1100 for determining a location of a terminal is provided. In some embodiments, the system 1100 implements method 100 of FIG. 1, method 200 of FIG. 2, method 300 of FIG. 3, method 400 of FIG. 4, method 500 of FIG. 5, method 600 of FIG. 6, method 700 of FIG. 7, method 800 of FIG. 8, method 900 of FIG. 9, or any combination thereof. In some embodiments, the device 1000 of FIG. 10 can be implemented in system 1100. For example, the device 1000 can correspond to server 1120, database 1140, the like, or any combination thereof.

The system 1100 for determining a location of a terminal includes a client terminal 1110, and a server 1120.

The system 1100 can also include a network over which the client terminal 1110 and the server 1120 can communicate. The network 1130 can be a LAN, a Wide Area Network (WAN), the Internet, or the like.

The system 1100 can include one or more databases 1140. In some embodiments, the database 1140 can correspond to a database indicating locations associated with MAC addresses. In some embodiments, the database 1140 can correspond to a database indicating locations associated with IP addresses. In some embodiments, the server 1120 can configure the database 1140. For example, the server 1120 can update the database 1140 (e.g., so as to update a mapping of locations to addresses such as a MAC address or an IP address). The server 1120 can query the database 1140 to determine a current location of terminal 1110 based at least in part on a MAC address or an IP address received from the terminal 1110 in connection with the access of the server 1120 (e.g., or the Internet) by the terminal 1110.

Figure 12:
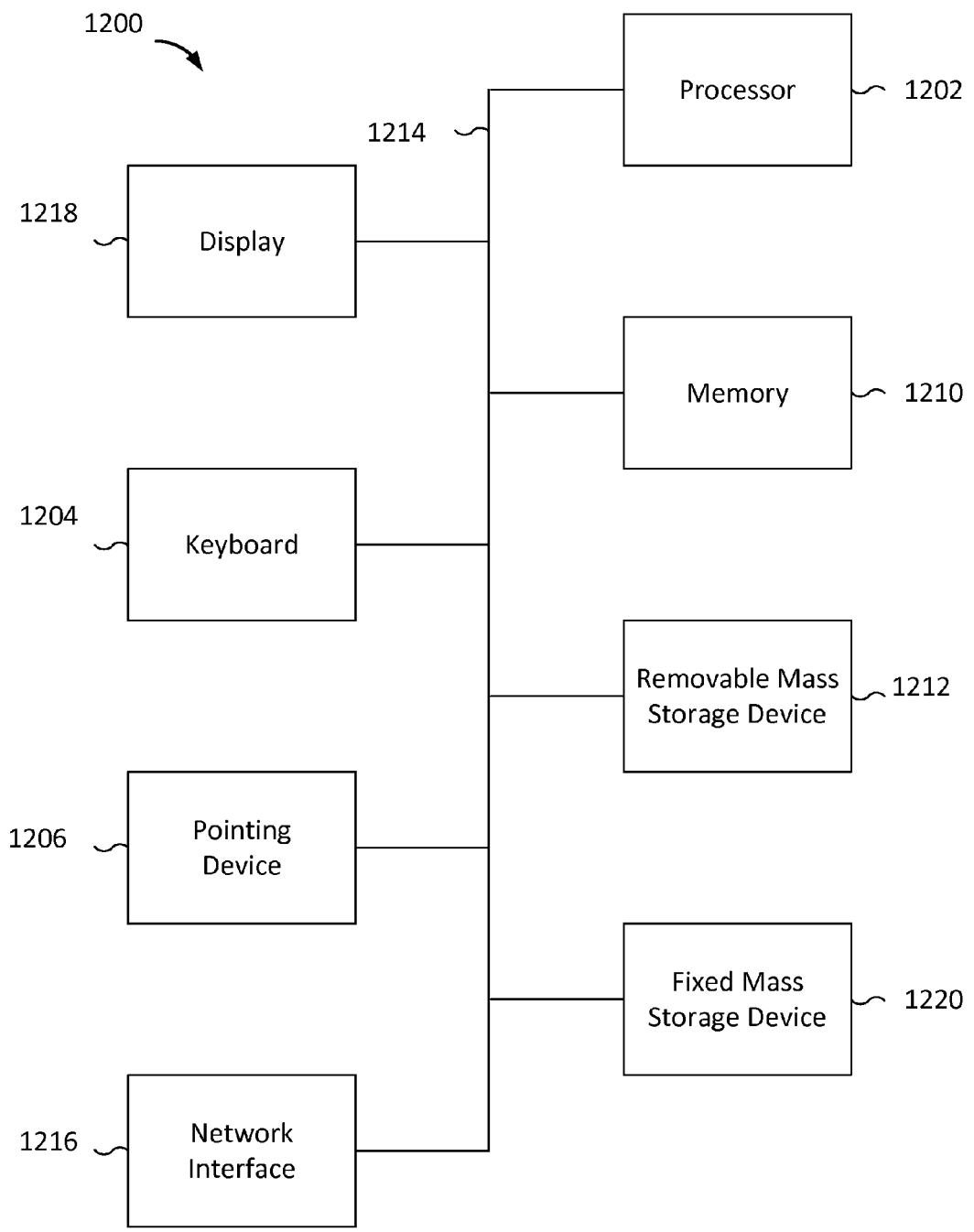
FIG. 12 is a functional diagram of a computer system for determining a location of a terminal according to various embodiments of the present application.

FIG. 12 is a functional diagram of a computer system for determining a location of a terminal according to various embodiments of the present disclosure.

Referring to FIG. 12, a computer system 1200 for accessing a website or for determining whether a terminal accessing the website is a mobile terminal is provided. As will be apparent, other computer system architectures and configurations can be used to implement video calls. Computer system 1200, which includes various subsystems as described below, includes at least one microprocessor subsystem (also referred to as a processor or a central processing unit (CPU)) 1202. For example, processor 1202 can be implemented by a single-chip processor or by multiple processors. In some embodiments, processor 1202 is a general purpose digital processor that controls the operation of the computer system 1200. Using instructions retrieved from memory 1210, the processor 1202 controls the reception and manipulation of input data, and the output and display of data on output devices (e.g., display 1218).

Processor 1202 is coupled bi-directionally with memory 1210, which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 1202. Also as is well known in the art, primary storage typically includes basic operating instructions, program code, data, and objects used by the processor 1202 to perform its functions (e.g., programmed instructions). For example, memory 1210 can include any suitable computer-readable storage media, described below, depending on whether, for example, data access needs to be bi-directional or uni-directional. For example, processor 1202 can also directly and very rapidly retrieve and store frequently needed data in a cache memory (not shown).

A removable mass storage device 1212 provides additional data storage capacity for the computer system 1200, and is coupled either bi-directionally (read/write) or uni-directionally (read only) to processor 1202. For example, storage 1212 can also include computer-readable media such as magnetic tape, flash memory, PC-CARDS, portable mass storage devices, holographic storage devices, and other storage devices. A fixed mass storage 1220 can also, for example, provide additional data storage capacity. The most common example of mass storage 1220 is a hard disk drive. Mass storage device 1212 and fixed mass storage 1220 generally store additional programming instructions, data, and the like that typically are not in active use by the processor 1202. It will be appreciated that the information retained within mass storage device 1212 and fixed mass storage 1220 can be incorporated, if needed, in standard fashion as part of memory 1210 (e.g., RAM) as virtual memory.

In addition to providing processor 1202 access to storage subsystems, bus 1214 can also be used to provide access to other subsystems and devices. As shown, these can include a display monitor 1218, a network interface 1216, a keyboard 1204, and a pointing device 1206, as well as an auxiliary input/output device interface, a sound card, speakers, and other subsystems as needed. For example, the pointing device 1206 can be a mouse, stylus, track ball, or tablet, and is useful for interacting with a graphical user interface.

The network interface 1216 allows processor 1202 to be coupled to another computer, computer network, or telecommunications network using a network connection as shown. For example, through the network interface 1216, the processor 1202 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 1202 can be used to connect the computer system 1200 to an external network and transfer data according to standard protocols. For example, various process embodiments disclosed herein can be executed on processor 1202, or can be performed across a network such as the Internet, intranet networks, or local area networks, in conjunction with a remote processor that shares a portion of the processing. Additional mass storage devices (not shown) can also be connected to processor 1202 through network interface 1216.

An auxiliary I/O device interface (not shown) can be used in conjunction with computer system 1200. The auxiliary I/O device interface can include general and customized interfaces that allow the processor 1202 to send and, more typically, receive data from other devices such as microphones, touch-sensitive displays, transducer card readers, tape readers, voice or handwriting recognizers, biometrics readers, cameras, portable mass storage devices, and other computers.

The computer system shown in FIG. 12 is but an example of a computer system suitable for use with the various embodiments disclosed herein. Other computer systems suitable for such use can include additional or fewer subsystems. In addition, bus 1214 is illustrative of any interconnection scheme serving to link the subsystems. Other computer architectures having different configurations of subsystems can also be utilized.

The modules described above can be implemented as software components executing on one or more general purpose processors, as hardware such as programmable logic devices, and/or Application Specific Integrated Circuits designed to perform certain functions or a combination thereof. In some embodiments, the modules can be embodied by a form of software products which can be stored in a nonvolatile storage medium (such as optical disk, flash storage device, mobile hard disk, etc.), including a number of instructions for making a computer device (such as personal computers, servers, network equipment, etc.) implement the methods described in the embodiments of the present invention. The modules may be implemented on a single device or distributed across multiple devices. The functions of the modules may be merged into one another or further split into multiple sub-modules.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:
1. A method, comprising:
acquiring a Media Access Control (MAC) address of a network equipment used by a terminal to access a network;
determining whether a database indicating locations associated with respective MAC addresses includes the acquired MAC address;
in the event that the database indicating locations associated with respective MAC addresses includes the acquired MAC address, determining that a current location of the terminal corresponds to a location associated with the acquired MAC address that is stored in the database;

in the event that the database indicating locations associated with respective MAC addresses does not include the acquired MAC address, acquiring an Internet Protocol (IP) address of the terminal;

determining whether a database indicating locations associated with respective IP addresses includes a location relating to the IP address of the terminal;

in the event that the database indicating locations associated with respective IP addresses includes the location relating to the IP address of the terminal, determining that the current location of the terminal corresponds to the location relating to the IP address of the terminal that is stored in the database; and outputting the current location of the terminal.

2. The method of claim 1, wherein the network equipment is a wireless signal transceiver equipment that communicates with the terminal using wireless signals.

3. The method of claim 1, further comprising:

configuring the database indicating locations associated with respective MAC addresses, wherein the configuring the database indicating locations associated with respective MAC addresses includes:

collecting MAC addresses and corresponding location information, wherein the location information comprises a latitude and a longitude of a device while the device connects to one or more networks using a network equipment corresponding to a particular MAC address; and using the collected MAC addresses and corresponding location information to determine latitudes and longitudes corresponding to each MAC address, and to generate a mapping of locations associated with respective MAC addresses.

4. The method of claim 3, wherein the using of the collected MAC addresses and corresponding location information to determine the latitudes and the longitudes corresponding to the MAC addresses and to generate the mapping of locations associated with respective MAC addresses comprises:

processing the location information corresponding to a collected MAC address to obtain one or more pieces of MAC address latitude and longitude data corresponding to the collected MAC address; and using the one or more pieces of MAC address latitude and longitude data corresponding to each MAC address to determine a latitude and a longitude corresponding to the particular MAC address.

5. The method of claim 4, wherein:

a plurality of pieces of MAC address latitude and longitude data are obtained; and the using of the one or more pieces of MAC address latitude and longitude data corresponding to the MAC address to determine the latitude and longitude corresponding to the MAC address comprises:

determining whether a distance between locations respectively corresponding to any two pieces of MAC address latitude and longitude data among the plurality of pieces of MAC address latitude and longitude data corresponding to each MAC address exceeds a threshold distance; and in the event that none of the distances between the locations respectively corresponding to any two pieces of MAC address latitude and longitude data among the plurality of pieces of MAC address latitude and longitude data corresponding to each MAC address exceeds the threshold distance, determining that the latitude and the longitude corresponding to the MAC address corresponds to an average of the latitudes and the longitudes of the plurality of pieces of MAC address latitude and longitude data.

6. The method of claim 5, further comprising:

in the event that a distance between the locations respectively corresponding to any two pieces of MAC address latitude and longitude data among the plurality of pieces of MAC address latitude and longitude data exceeds the threshold distance, determining that the latitude and the longitude corresponding to the MAC address corresponds to a latitude and a longitude associated with a predetermined quantity of MAC address latitude and longitude data with a greatest number of occurrence days among the plurality of MAC address latitude and longitude data.

7. The method of claim 4, further comprising:

determining a confidence level of each latitude and longitude corresponding to each MAC address stored in the database.

8. The method of claim 1, further comprising configuring the database indicating locations associated with respective IP addresses, including:

collecting IP addresses and location information respectively corresponding to the IP addresses, wherein the location information corresponding to an IP address of the collected IP addresses comprises: geographic coordinates of a location at which the Internet was accessed through the respective IP address;

determining latitudes and longitudes corresponding respectively to the IP addresses based at least in part on the location information; and configuring the database indicating locations associated with respective IP addresses based at least in part on one of the determined latitudes and longitudes corresponding to the IP addresses and a previously acquired IP address base database.

9. The method of claim 8, wherein the determining of the latitudes and the longitudes corresponding to the IP addresses based at least in part on the location information comprises:

processing a collected IP address and a piece of IP address location information to obtain one or more pieces of IP address geographic coordinate data corresponding to the collected IP address; and using the one or more pieces of IP address geographic coordinate data corresponding to the collected IP address to determine the latitude and the longitude corresponding to the IP address.

10. The method of claim 9, wherein the using of the one or more pieces of IP address geographic coordinate data corresponding to the collected IP address to determine the latitude and the longitude corresponding to the IP address comprises:

determining, for the IP address, a weight of each piece of IP address geographic coordinate data corresponding to the IP address; and determining that geographic coordinates associated with the IP address correspond to geographic coordinates in the IP address geographic coordinate data having a greatest weight among the one or more pieces of IP address geographic coordinate data corresponding to the IP address.

11. The method of claim 10, wherein the determining, for the IP address, the weight of each piece of IP address geographic coordinate data corresponding to the IP address comprises:
  acquiring one or more pieces of IP address geographic coordinate data that occur within a threshold range of locations corresponding to each piece of IP address geographic coordinate data corresponding to the IP address; and
  determining a weight of each piece of IP address latitude and longitude data corresponding to the IP address according to a number of occurrence days of each piece of IP address latitude and longitude data corresponding to the IP address within a threshold time period and a number of occurrence days of one or more pieces of IP address latitude and longitude data occurring within a threshold range of a corresponding location.

12. The method of claim 8, further comprising:
updating the database indicating locations associated with respective IP addresses at predetermined intervals, wherein the updating of the database comprises:
  collecting IP addresses that have occurred in a current day and location information of each collected IP address;
  determining a latitude and a longitude associated with the location information of each collected IP address having an occurrence time that is closest to a current time to correspond to a latitude and a longitude currently corresponding to a particular IP address;
  determining whether the database indicating locations associated with respective IP addresses includes the particular IP address; and
  in the event that the database indicating locations associated with respective IP addresses does not include the particular IP address, then adding the particular IP address and corresponding latitude and longitude to the database indicating locations associated with respective IP addresses.

13. The method of claim 12, further comprising:
in the event that the database indicating locations associated with respective IP addresses includes the particular IP address, determining whether a distance between a location corresponding to the particular IP address in the database indicating locations associated with respective IP addresses and the latitude and the longitude currently corresponding to the particular IP address exceeds a threshold distance; and
in the event that the distance between the location corresponding to the particular IP address in the database indicating locations associated with respective IP addresses and the latitude and the longitude currently corresponding to the particular IP address exceeds the threshold distance, substituting latitude and longitude corresponding to the particular IP address in the database indicating locations associated with respective IP addresses with the latitude and the longitude currently corresponding to the particular IP address.

14. A device, comprising:
at least one processor configured to:
  acquire a Media Access Control (MAC) address of a network equipment used by a terminal to access a network;
  determine whether a database indicating locations associated with respective MAC addresses includes the acquired MAC address;
  in the event that the database indicating locations associated with respective MAC addresses includes the acquired MAC address, determine that a current location of the terminal corresponds to a location associated with the acquired MAC address that is stored in the database;
  in the event that the database indicating locations associated with respective MAC addresses does not include the acquired MAC address, acquiring an Internet Protocol (IP) address of the terminal;
  determine whether a database indicating locations associated with respective IP addresses includes a location relating to the IP address of the terminal;
  in the event that the database indicating locations associated with respective IP addresses includes the location relating to the IP address of the terminal, determine that the current location of the terminal corresponds to the location relating to the IP address of the terminal that is stored in the database; and
  output the current location of the terminal; and
a memory coupled to the at least one processor and configured to provide the at least one processor with instructions.

15. The device of claim 14, wherein the network equipment is a wireless signal transceiver equipment that communicates with the terminal using wireless signals.

16. A computer program product embodied in a tangible non-transitory computer-readable storage medium and comprising computer instructions for:
  acquiring a Media Access Control (MAC) address of a network equipment used by a terminal to access a network;
  determining whether a database indicating locations associated with respective MAC addresses includes the acquired MAC address;
  in the event that the database indicating locations associated with respective MAC addresses includes the acquired MAC address, determining that a current location of the terminal corresponds to a location associated with the acquired MAC address that is stored in the database;
  in the event that the database indicating locations associated with respective MAC addresses does not include the acquired MAC address, acquiring an Internet Protocol (IP) address of the terminal;
  determining whether a database indicating locations associated with respective IP addresses includes the location relating to the IP address of the terminal;
  in the event that the database indicating locations associated with respective IP addresses includes the location relating to the IP address of the terminal, determining that the current location of the terminal corresponds to the location relating to the IP address of the terminal that is stored in the database; and
  outputting the current location of the terminal.

17. The computer program product of claim 16, wherein the network equipment is a wireless signal transceiver equipment that communicates with the terminal using wireless signals.

18. The computer program product of claim 16, further comprising computer instructions for:
  configuring the database indicating locations associated with respective MAC addresses, wherein the configuring the database indicating locations associated with respective MAC addresses includes:
    collecting MAC addresses and corresponding location information, wherein the location information comprises a latitude and a longitude of a device while the device connects to one or more networks using a network equipment corresponding to a particular MAC address; and using the collected MAC addresses and corresponding location information to determine latitudes and longitudes corresponding to each MAC address, and to generate a mapping of locations associated with respective MAC addresses.

19. A method, comprising:

configuring a database indicating locations associated with respective Media Access Control (MAC) addresses, including:
- collecting MAC addresses and corresponding location information, wherein the location information comprises a latitude and a longitude of a device while the device connects to one or more networks using a network equipment corresponding to a particular MAC address; and
- using the collected MAC addresses and corresponding location information to determine latitudes and longitudes corresponding to each MAC address, and to generate a mapping of locations associated with respective MAC addresses, including:
  - processing the location information corresponding to a collected MAC address to obtain a plurality of pieces of MAC address latitude and longitude data corresponding to the collected MAC address; and
  - using the plurality pieces of MAC address latitude and longitude data corresponding to each MAC address to determine a latitude and a longitude corresponding to the particular MAC address, including:
    - determining whether a distance between locations respectively corresponding to any two pieces of MAC address latitude and longitude data among the plurality of pieces of MAC address latitude and longitude data corresponding to each MAC address exceeds a threshold distance; and
    - in the event that none of the distances between the locations respectively corresponding to any two pieces of MAC address latitude and longitude data among the plurality of pieces of MAC address latitude and longitude data corresponding to each MAC address exceeds the threshold distance, determining that the latitude and the longitude corresponding to the MAC address corresponds to an average of the latitudes and the longitudes of the plurality of pieces of MAC address latitude and longitude data;

acquiring a MAC address of a network equipment used by a terminal to access a network;

determining whether the database indicating locations associated with respective MAC addresses includes the acquired MAC address;

in the event that the database indicating locations associated with respective MAC addresses includes the acquired MAC address, determining that a current location of the terminal corresponds to a location associated with the acquired MAC address that is stored in the database; and outputting the current location of the terminal.

* * * * *